(12) United States Patent
Raichelgauz et al.

(10) Patent No.: US 10,585,934 B2
(45) Date of Patent: Mar. 10, 2020

(54) METHOD AND SYSTEM FOR POPULATING A CONCEPT DATABASE WITH RESPECT TO USER IDENTIFIERS

(71) Applicant: Cortica, Ltd., Tel Aviv (IL)

(72) Inventors: Igal Raichelgauz, Tel Aviv (IL); Karina Odinaev, Tel Aviv (IL); Yehoshua Y Zeevi, Haifa (IL)

(73) Assignee: CORTICA LTD., Tel Aviv (IL)

( * ) Notice: Subject to any disclaimer, the term of this patent is extended or adjusted under 35 U.S.C. 154(b) by 0 days.

(21) Appl. No.: 15/647,888

(22) Filed: Jul. 12, 2017

(65) Prior Publication Data

US 2017/0315994 A1    Nov. 2, 2017

Related U.S. Application Data

(63) Continuation-in-part of application No. 14/597,324, filed on Jan. 15, 2015, now abandoned, and a
(Continued)

(30) Foreign Application Priority Data

Oct. 26, 2005 (IL) .......................................... 171577
Jan. 29, 2006 (IL) .......................................... 173409
Aug. 21, 2007 (IL) .......................................... 185414

(51) Int. Cl.
*G06F 16/41* (2019.01)
*G06F 16/14* (2019.01)

(52) U.S. Cl.
CPC .............. *G06F 16/41* (2019.01); *G06F 16/14* (2019.01); *G06F 16/152* (2019.01); *Y10S 707/99943* (2013.01); *Y10S 707/99948* (2013.01)

(58) Field of Classification Search
CPC ......... G06F 17/30067; G06F 17/30864; G06F 16/41
See application file for complete search history.

(56) References Cited

U.S. PATENT DOCUMENTS 4,733,353 A    3/1988 Jaswa
4,932,645 A    6/1990 Schorey et al.
(Continued)

FOREIGN PATENT DOCUMENTS

EP        1085464 A3      1/2007
NO        20070049282     5/2007
(Continued)

OTHER PUBLICATIONS

Santos, et al., "SCORM-MPEG: an Ontology of Interoperable Metadata for Multimedia and e-Learning", 2015 23rd International Conference on Software, Telecommunications and Computer Networks (SoftCOM) Year: 2015, pp. 224-228, DOI: 10.1109/SOFTCOM. 2015.7314122 IEEE Conference Publications.
(Continued)

*Primary Examiner* — Mohammad S Rostami
(74) *Attorney, Agent, or Firm* — Reches Patents

(57) ABSTRACT

A method and system for populating a concept database based on a plurality of multimedia data elements (MMDEs) and at least one user identifier, the concept database including a plurality of concept structures. The method includes clustering a plurality of signatures of the plurality of MMDEs into a cluster of signatures; reducing the number of signatures in the cluster to a create a signature reduced cluster (SRC); generating, based on the SRC and the plurality of concept structures, an index, wherein the index maps the plurality of MMDEs to a matching concept structure of the plurality of concept structures; associating the index with a user based on the at least one user identifier; and
(Continued)

storing the index and the plurality of MMDEs in the concept database.

23 Claims, 8 Drawing Sheets

Related U.S. Application Data continuation-in-part of application No. 13/766,463, filed on Feb. 13, 2013, now Pat. No. 9,031,999, which is a continuation-in-part of application No. 13/602,858, filed on Sep. 4, 2012, now Pat. No. 8,868,619, which is a continuation of application No. 12/603,123, filed on Oct. 21, 2009, now Pat. No. 8,266,185, which is a continuation-in-part of application No. 12/084,150, filed as application No. PCT/IL2006/001235 on Oct. 26, 2006, now Pat. No. 8,655,801, said application No. 12/603,123 is a continuation-in-part of application No. 12/195,863, filed on Aug. 21, 2008, now Pat. No. 8,326,775, which is a continuation-in-part of application No. 12/084,150, filed on Apr. 7, 2009, now Pat. No. 8,655,801, said application No. 12/603,123 is a continuation-in-part of application No. 12/348,888, filed on Jan. 5, 2009, now Pat. No. 9,798,795, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, said application No. 12/603,123 is a continuation-in-part of application No. 12/538,495, filed on Aug. 10, 2009, now Pat. No. 8,312,031, which is a continuation-in-part of application No. 12/084,150, filed on Apr. 7, 2009, now Pat. No. 8,655,801, and a continuation-in-part of application No. 12/195,863, filed on Aug. 21, 2008, now Pat. No. 8,326,775, and a continuation-in-part of application No. 12/348,888, filed on Jan. 5, 2009, now Pat. No. 9,798,795.

(60) Provisional application No. 62/360,980, filed on Jul. 12, 2016, provisional application No. 61/928,468, filed on Jan. 17, 2014.

(56) References Cited

U.S. PATENT DOCUMENTS

| | | |
|---|---|---|
| 4,972,363 A | 11/1990 | Nguyen et al. |
| 5,214,746 A | 5/1993 | Fogel et al. |
| 5,307,451 A | 4/1994 | Clark |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador et al. |
| 5,745,678 A | 4/1998 | Herzberg et al. |
| 5,763,069 A | 6/1998 | Jordan |
| 5,806,061 A | 9/1998 | Chaudhuri et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,940,821 A | 8/1999 | Wical |
| 5,978,754 A | 11/1999 | Kumano |
| 5,987,454 A | 11/1999 | Hobbs |
| 5,991,306 A | 11/1999 | Burns et al. |
| 6,038,560 A | 3/2000 | Wical |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,240,423 B1 | 5/2001 | Hirata |
| 6,243,375 B1 | 6/2001 | Speicher |
| 6,243,713 B1 | 6/2001 | Nelson et al. |
| 6,275,599 B1 | 8/2001 | Adler et al. |
| 6,329,986 B1 | 12/2001 | Cheng |
| 6,363,373 B1 | 3/2002 | Steinkraus |
| 6,381,656 B1 | 4/2002 | Shankman |
| 6,411,229 B2 | 6/2002 | Kobayashi |
| 6,422,617 B1 | 7/2002 | Fukumoto et al. |
| 6,493,692 B1 | 12/2002 | Kobayashi et al. |
| 6,493,705 B1 | 12/2002 | Kobayashi et al. |
| 6,507,672 B1 | 1/2003 | Watkins et al. |
| 6,523,022 B1 | 2/2003 | Hobbs |
| 6,523,046 B2 | 2/2003 | Liu et al. |
| 6,524,861 B1 | 2/2003 | Anderson |
| 6,526,400 B1 | 2/2003 | Takata et al. |
| 6,550,018 B1 | 4/2003 | Abonamah et al. |
| 6,557,042 B1 | 4/2003 | He et al. |
| 6,560,597 B1 | 5/2003 | Dhillon et al. |
| 6,594,699 B1 | 7/2003 | Sahai et al. |
| 6,601,026 B2 | 7/2003 | Appelt et al. |
| 6,601,060 B1 | 7/2003 | Tomaru |
| 6,611,628 B1 | 8/2003 | Sekiguchi et al. |
| 6,611,837 B2 | 8/2003 | Schreiber |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,675,159 B1 | 1/2004 | Lin et al. |
| 6,681,032 B2 | 1/2004 | Bortolussi et al. |
| 6,704,725 B1 | 3/2004 | Lee |
| 6,728,706 B2 | 4/2004 | Aggarwal et al. |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,836,776 B2 | 12/2004 | Schreiber |
| 6,845,374 B1 | 1/2005 | Oliver et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,970,881 B1 | 11/2005 | Mohan et al. |
| 6,978,264 B2 | 12/2005 | Chandrasekar et al. |
| 6,985,172 B1 | 1/2006 | Rigney et al. |
| 7,006,689 B2 | 2/2006 | Kasutani |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,124,149 B2 | 10/2006 | Smith et al. |
| 7,158,681 B2 | 1/2007 | Persiantsev |
| 7,199,798 B1 | 4/2007 | Echigo et al. |
| 7,215,828 B2 | 5/2007 | Luo |
| 7,260,564 B1 | 8/2007 | Lynn et al. |
| 7,277,928 B2 | 10/2007 | Lennon |
| 7,296,012 B2 | 11/2007 | Ohashi |
| 7,299,261 B1 | 11/2007 | Oliver et al. |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,392,238 B1 | 6/2008 | Zhou et al. |
| 7,406,459 B2 | 7/2008 | Chen et al. |
| 7,433,895 B2 | 10/2008 | Li et al. |

(56) References Cited

U.S. PATENT DOCUMENTS

| | | |
|---|---|---|
| 7,450,740 B2 | 11/2008 | Shah et al. |
| 7,464,086 B2 | 12/2008 | Black et al. |
| 7,523,102 B2 | 4/2009 | Bjarnestam et al. |
| 7,526,607 B1 | 4/2009 | Singh et al. |
| 7,529,659 B2 | 5/2009 | Wold |
| 7,536,384 B2 | 5/2009 | Venkataraman et al. |
| 7,542,969 B1 | 6/2009 | Rappaport et al. |
| 7,548,910 B1 | 6/2009 | Chu et al. |
| 7,555,477 B2 | 6/2009 | Bayley et al. |
| 7,555,478 B2 | 6/2009 | Bayley et al. |
| 7,562,076 B2 | 7/2009 | Kapur |
| 7,574,436 B2 | 8/2009 | Kapur et al. |
| 7,574,668 B2 | 8/2009 | Nunez et al. |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,694,318 B2 | 4/2010 | Eldering et al. |
| 7,836,054 B2 | 11/2010 | Kawai et al. |
| 7,920,894 B2 | 4/2011 | Wyler |
| 7,921,107 B2 | 4/2011 | Chang et al. |
| 7,933,407 B2 | 4/2011 | Keidar et al. |
| 7,974,994 B2 | 7/2011 | Li et al. |
| 7,987,194 B1 | 7/2011 | Walker et al. |
| 7,987,217 B2 | 7/2011 | Long et al. |
| 7,991,715 B2 | 8/2011 | Schiff et al. |
| 8,000,655 B2 | 8/2011 | Wang et al. |
| 8,023,739 B2 | 9/2011 | Hohimer et al. |
| 8,036,893 B2 | 10/2011 | Reich |
| 8,098,934 B2 | 1/2012 | Vincent et al. |
| 8,112,376 B2 | 2/2012 | Raichelgauz et al. |
| 8,266,185 B2 | 9/2012 | Raichelgauz et al. |
| 8,312,031 B2 | 11/2012 | Raichelgauz et al. |
| 8,315,442 B2 | 11/2012 | Gokturk et al. |
| 8,316,005 B2 | 11/2012 | Moore |
| 8,326,775 B2 | 12/2012 | Raichelgauz et al. |
| 8,345,982 B2 | 1/2013 | Gokturk et al. |
| 8,457,827 B1 | 6/2013 | Ferguson et al. |
| 8,495,489 B1 | 7/2013 | Everingham |
| 8,548,828 B1 | 10/2013 | Longmire |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| 8,677,377 B2 | 3/2014 | Cheyer et al. |
| 8,682,667 B2 | 3/2014 | Haughay |
| 8,688,446 B2 | 4/2014 | Yanagihara |
| 8,706,503 B2 | 4/2014 | Cheyer et al. |
| 8,775,442 B2 | 7/2014 | Moore et al. |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,619 B2 | 10/2014 | Raichelgauz et al. |
| 8,868,861 B2 | 10/2014 | Shimizu et al. |
| 8,880,539 B2 | 11/2014 | Raichelgauz et al. |
| 8,880,566 B2 | 11/2014 | Raichelgauz et al. |
| 8,886,648 B1 | 11/2014 | Procopio et al. |
| 8,898,568 B2 | 11/2014 | Bull et al. |
| 8,922,414 B2 | 12/2014 | Raichelgauz et al. |
| 8,959,037 B2 | 2/2015 | Raichelgauz et al. |
| 8,990,125 B2 | 3/2015 | Raichelgauz et al. |
| 8,990,199 B1 | 3/2015 | Ramesh et al. |
| 9,009,086 B2 | 4/2015 | Raichelgauz et al. |
| 9,031,999 B2 | 5/2015 | Raichelgauz et al. |
| 9,087,049 B2 | 7/2015 | Raichelgauz et al. |
| 9,104,747 B2 | 8/2015 | Raichelgauz et al. |
| 9,165,406 B1 | 10/2015 | Ray et al. |
| 9,191,626 B2 | 11/2015 | Raichelgauz et al. |
| 9,197,244 B2 | 11/2015 | Raichelgauz et al. |
| 9,218,606 B2 | 12/2015 | Raichelgauz et al. |
| 9,235,557 B2 | 1/2016 | Raichelgauz et al. |
| 9,256,668 B2 | 2/2016 | Raichelgauz et al. |
| 9,323,754 B2 | 4/2016 | Ramanathan et al. |
| 9,330,189 B2 | 5/2016 | Raichelgauz et al. |
| 9,438,270 B2 | 9/2016 | Raichelgauz et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,875,445 B2 | 1/2018 | Amer et al. |
| 9,984,369 B2 | 5/2018 | Li et al. |
| 2001/0019633 A1 | 9/2001 | Tenze et al. |
| 2001/0038876 A1 | 11/2001 | Anderson |
| 2001/0056427 A1 | 12/2001 | Yoon et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0037010 A1 | 3/2002 | Yamauchi |
| 2002/0038299 A1 | 3/2002 | Zernik et al. |
| 2002/0042914 A1 | 4/2002 | Walker et al. |
| 2002/0059580 A1 | 5/2002 | Kalker et al. |
| 2002/0072935 A1 | 6/2002 | Rowse et al. |
| 2002/0087530 A1 | 7/2002 | Smith et al. |
| 2002/0099870 A1 | 7/2002 | Miller et al. |
| 2002/0107827 A1 | 8/2002 | Benitez-Jimenez et al. |
| 2002/0113812 A1 | 8/2002 | Walker et al. |
| 2002/0123928 A1 | 9/2002 | Eldering et al. |
| 2002/0126872 A1 | 9/2002 | Brunk et al. |
| 2002/0129140 A1 | 9/2002 | Peled et al. |
| 2002/0129296 A1 | 9/2002 | Kwiat et al. |
| 2002/0143976 A1 | 10/2002 | Barker et al. |
| 2002/0147637 A1 | 10/2002 | Kraft et al. |
| 2002/0152267 A1 | 10/2002 | Lennon |
| 2002/0157116 A1 | 10/2002 | Jasinschi |
| 2002/0159640 A1 | 10/2002 | Vaithilingam et al. |
| 2002/0161739 A1 | 10/2002 | Oh |
| 2002/0163532 A1 | 11/2002 | Thomas et al. |
| 2002/0174095 A1 | 11/2002 | Lulich et al. |
| 2002/0178410 A1 | 11/2002 | Haitsma et al. |
| 2002/0184505 A1 | 12/2002 | Mihcak et al. |
| 2003/0005432 A1 | 1/2003 | Ellis et al. |
| 2003/0028660 A1 | 2/2003 | Igawa et al. |
| 2003/0041047 A1 | 2/2003 | Chang et al. |
| 2003/0050815 A1 | 3/2003 | Seigel et al. |
| 2003/0078766 A1 | 4/2003 | Appelt et al. |
| 2003/0086627 A1 | 5/2003 | Berriss et al. |
| 2003/0089216 A1 | 5/2003 | Birmingham et al. |
| 2003/0093790 A1 | 5/2003 | Logan et al. |
| 2003/0101150 A1 | 5/2003 | Agnihotri |
| 2003/0105739 A1 | 6/2003 | Essafi et al. |
| 2003/0115191 A1 | 6/2003 | Cooperman et al. |
| 2003/0126147 A1 | 7/2003 | Essafi et al. |
| 2003/0182567 A1 | 9/2003 | Barton et al. |
| 2003/0184598 A1 | 10/2003 | Graham |
| 2003/0191764 A1 | 10/2003 | Richards |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0003394 A1 | 1/2004 | Ramaswamy |
| 2004/0025180 A1 | 2/2004 | Begeja et al. |
| 2004/0068510 A1 | 4/2004 | Hayes et al. |
| 2004/0095376 A1 | 5/2004 | Graham et al. |
| 2004/0098671 A1 | 5/2004 | Graham et al. |
| 2004/0107181 A1 | 6/2004 | Rodden |
| 2004/0111432 A1 | 6/2004 | Adams et al. |
| 2004/0111465 A1 | 6/2004 | Chuang et al. |
| 2004/0117367 A1 | 6/2004 | Smith et al. |
| 2004/0117638 A1 | 6/2004 | Monroe |
| 2004/0128142 A1 | 7/2004 | Whitham |
| 2004/0128511 A1 | 7/2004 | Sun et al. |
| 2004/0133927 A1 | 7/2004 | Sternberg et al. |
| 2004/0153426 A1 | 8/2004 | Nugent |
| 2004/0215663 A1 | 10/2004 | Liu et al. |
| 2004/0249779 A1 | 12/2004 | Nauck et al. |
| 2004/0260688 A1 | 12/2004 | Gross |
| 2004/0267774 A1 | 12/2004 | Lin et al. |
| 2005/0021394 A1 | 1/2005 | Miedema et al. |
| 2005/0114198 A1 | 5/2005 | Koningstein et al. |
| 2005/0131884 A1 | 6/2005 | Gross et al. |
| 2005/0144455 A1 | 6/2005 | Haitsma |
| 2005/0163375 A1 | 7/2005 | Grady |
| 2005/0172130 A1 | 8/2005 | Roberts |
| 2005/0177372 A1 | 8/2005 | Wang et al. |
| 2005/0238198 A1 | 10/2005 | Brown et al. |
| 2005/0238238 A1 | 10/2005 | Xu et al. |

(56) References Cited

U.S. PATENT DOCUMENTS

| | | |
|---|---|---|
| 2005/0245241 A1 | 11/2005 | Durand et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0013451 A1 | 1/2006 | Haitsma |
| 2006/0020860 A1 | 1/2006 | Tardif et al. |
| 2006/0020958 A1 | 1/2006 | Allamanche et al. |
| 2006/0026203 A1 | 2/2006 | Tan et al. |
| 2006/0031216 A1 | 2/2006 | Semple et al. |
| 2006/0033163 A1 | 2/2006 | Chen |
| 2006/0041596 A1 | 2/2006 | Stirbu et al. |
| 2006/0048191 A1 | 3/2006 | Xiong |
| 2006/0064037 A1 | 3/2006 | Shalon et al. |
| 2006/0112035 A1 | 5/2006 | Cecchi et al. |
| 2006/0129822 A1 | 6/2006 | Snijder et al. |
| 2006/0143674 A1 | 6/2006 | Jones et al. |
| 2006/0153296 A1 | 7/2006 | Deng |
| 2006/0159442 A1 | 7/2006 | Kim et al. |
| 2006/0173688 A1 | 8/2006 | Whitham |
| 2006/0184638 A1 | 8/2006 | Chua et al. |
| 2006/0204035 A1 | 9/2006 | Guo et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri |
| 2006/0242139 A1 | 10/2006 | Butterfield et al. |
| 2006/0242554 A1 | 10/2006 | Gerace et al. |
| 2006/0247983 A1 | 11/2006 | Dalli |
| 2006/0248558 A1 | 11/2006 | Barton et al. |
| 2006/0253423 A1 | 11/2006 | McLane et al. |
| 2006/0288002 A1 | 12/2006 | Epstein et al. |
| 2007/0009159 A1 | 1/2007 | Fan |
| 2007/0011151 A1 | 1/2007 | Hagar et al. |
| 2007/0019864 A1 | 1/2007 | Koyama et al. |
| 2007/0022374 A1* | 1/2007 | Huang .............. G06F 17/30722 715/205 |
| 2007/0033163 A1 | 2/2007 | Epstein et al. |
| 2007/0038608 A1 | 2/2007 | Chen |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0067682 A1 | 3/2007 | Fang |
| 2007/0071330 A1 | 3/2007 | Oostveen et al. |
| 2007/0074147 A1 | 3/2007 | Wold |
| 2007/0083611 A1 | 4/2007 | Farago et al. |
| 2007/0091106 A1 | 4/2007 | Moroney |
| 2007/0130112 A1 | 6/2007 | Lin |
| 2007/0130159 A1 | 6/2007 | Gulli et al. |
| 2007/0156720 A1 | 7/2007 | Maren |
| 2007/0168413 A1 | 7/2007 | Barletta et al. |
| 2007/0174320 A1 | 7/2007 | Chou |
| 2007/0195987 A1 | 8/2007 | Rhoads |
| 2007/0220573 A1 | 9/2007 | Chiussi et al. |
| 2007/0244902 A1 | 10/2007 | Seide et al. |
| 2007/0253594 A1 | 11/2007 | Lu et al. |
| 2007/0255785 A1 | 11/2007 | Hayashi et al. |
| 2007/0268309 A1 | 11/2007 | Tanigawa et al. |
| 2007/0282826 A1 | 12/2007 | Hoeber et al. |
| 2007/0294295 A1 | 12/2007 | Finkelstein et al. |
| 2007/0298152 A1 | 12/2007 | Baets |
| 2008/0046406 A1 | 2/2008 | Seide et al. |
| 2008/0049629 A1 | 2/2008 | Morrill |
| 2008/0049789 A1 | 2/2008 | Vedantham et al. |
| 2008/0072256 A1 | 3/2008 | Boicey et al. |
| 2008/0079729 A1 | 4/2008 | Brailovsky |
| 2008/0091527 A1 | 4/2008 | Silverbrook et al. |
| 2008/0152231 A1 | 6/2008 | Gokturk et al. |
| 2008/0159622 A1 | 7/2008 | Agnihotri et al. |
| 2008/0163288 A1 | 7/2008 | Ghosal et al. |
| 2008/0165861 A1 | 7/2008 | Wen et al. |
| 2008/0172615 A1 | 7/2008 | Igelman et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0204706 A1 | 8/2008 | Magne et al. |
| 2008/0228995 A1 | 9/2008 | Tan et al. |
| 2008/0237359 A1 | 10/2008 | Silverbrook et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0307454 A1 | 12/2008 | Ahanger et al. |
| 2008/0313140 A1 | 12/2008 | Pereira et al. |
| 2009/0013414 A1 | 1/2009 | Washington et al. |
| 2009/0022472 A1 | 1/2009 | Bronstein et al. |
| 2009/0024641 A1 | 1/2009 | Quigley et al. |
| 2009/0037408 A1 | 2/2009 | Rodgers |
| 2009/0043637 A1 | 2/2009 | Eder |
| 2009/0089587 A1 | 4/2009 | Brunk et al. |
| 2009/0119157 A1 | 5/2009 | Dulepet |
| 2009/0125544 A1 | 5/2009 | Brindley |
| 2009/0148045 A1 | 6/2009 | Lee et al. |
| 2009/0157575 A1 | 6/2009 | Schobben et al. |
| 2009/0172030 A1 | 7/2009 | Schiff et al. |
| 2009/0175538 A1 | 7/2009 | Bronstein et al. |
| 2009/0208106 A1 | 8/2009 | Dunlop et al. |
| 2009/0216761 A1 | 8/2009 | Raichelgauz et al. |
| 2009/0220138 A1 | 9/2009 | Zhang et al. |
| 2009/0245573 A1 | 10/2009 | Saptharishi et al. |
| 2009/0245603 A1 | 10/2009 | Koruga et al. |
| 2009/0253583 A1 | 10/2009 | Yoganathan |
| 2009/0254572 A1 | 10/2009 | Redlich et al. |
| 2009/0277322 A1 | 11/2009 | Cai et al. |
| 2009/0282218 A1 | 11/2009 | Raichelgauz et al. |
| 2009/0297048 A1 | 12/2009 | Slotine et al. |
| 2010/0042646 A1 | 2/2010 | Raichelgauz et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0162405 A1 | 6/2010 | Cook et al. |
| 2010/0173269 A1 | 7/2010 | Puri et al. |
| 2010/0198626 A1 | 8/2010 | Cho et al. |
| 2010/0268524 A1 | 10/2010 | Nath et al. |
| 2010/0284604 A1 | 11/2010 | Chrysanthakopoulos |
| 2010/0306193 A1 | 12/2010 | Pereira et al. |
| 2010/0312736 A1 | 12/2010 | Kello |
| 2010/0318493 A1 | 12/2010 | Wessling |
| 2010/0322522 A1 | 12/2010 | Wang et al. |
| 2010/0325138 A1 | 12/2010 | Lee et al. |
| 2010/0325581 A1 | 12/2010 | Finkelstein et al. |
| 2011/0052063 A1 | 3/2011 | McAuley et al. |
| 2011/0055585 A1 | 3/2011 | Lee |
| 2011/0145068 A1 | 6/2011 | King et al. |
| 2011/0164180 A1 | 7/2011 | Lee |
| 2011/0164810 A1 | 7/2011 | Zang et al. |
| 2011/0202848 A1 | 8/2011 | Ismalon |
| 2011/0218946 A1 | 9/2011 | Stern et al. |
| 2011/0246566 A1 | 10/2011 | Kashef et al. |
| 2011/0251896 A1 | 10/2011 | Impollonia et al. |
| 2011/0276680 A1 | 11/2011 | Rimon |
| 2011/0296315 A1 | 12/2011 | Lin et al. |
| 2011/0313856 A1 | 12/2011 | Cohen et al. |
| 2012/0082362 A1 | 4/2012 | Diem et al. |
| 2012/0131454 A1 | 5/2012 | Shah |
| 2012/0150890 A1 | 6/2012 | Jeong et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0197857 A1 | 8/2012 | Huang et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0299961 A1 | 11/2012 | Ramkumar et al. |
| 2012/0301105 A1 | 11/2012 | Rehg et al. |
| 2012/0330869 A1 | 12/2012 | Durham |
| 2012/0331011 A1 | 12/2012 | Raichelgauz et al. |
| 2013/0031489 A1 | 1/2013 | Gubin et al. |

(56) References Cited

U.S. PATENT DOCUMENTS

| | | |
|---|---|---|
| 2013/0066856 A1 | 3/2013 | Ong et al. |
| 2013/0067035 A1 | 3/2013 | Amanat et al. |
| 2013/0067364 A1 | 3/2013 | Berntson et al. |
| 2013/0086499 A1 | 4/2013 | Dyor et al. |
| 2013/0089248 A1 | 4/2013 | Remiszewski |
| 2013/0104251 A1 | 4/2013 | Moore et al. |
| 2013/0159298 A1 | 6/2013 | Mason et al. |
| 2013/0173635 A1 | 7/2013 | Sanjeev |
| 2013/0226930 A1 | 8/2013 | Amgren et al. |
| 2013/0283401 A1 | 10/2013 | Pabla et al. |
| 2013/0325550 A1 | 12/2013 | Varghese et al. |
| 2013/0332951 A1 | 12/2013 | Gharaat et al. |
| 2014/0019264 A1 | 1/2014 | Nachman et al. |
| 2014/0025692 A1 | 1/2014 | Pappas |
| 2014/0147829 A1 | 5/2014 | Jerauld |
| 2014/0152698 A1 | 6/2014 | Kim et al. |
| 2014/0169681 A1 | 6/2014 | Drake |
| 2014/0176604 A1 | 6/2014 | Venkitaraman et al. |
| 2014/0188786 A1 | 7/2014 | Raichelgauz et al. |
| 2014/0193077 A1 | 7/2014 | Shiiyama et al. |
| 2014/0250032 A1 | 9/2014 | Huang et al. |
| 2014/0282655 A1 | 9/2014 | Roberts |
| 2014/0300722 A1 | 10/2014 | Garcia |
| 2014/0310825 A1 | 10/2014 | Raichelgauz et al. |
| 2014/0330830 A1 | 11/2014 | Raichelgauz et al. |
| 2014/0341476 A1 | 11/2014 | Kulick et al. |
| 2015/0100562 A1 | 4/2015 | Kohlmeier et al. |
| 2015/0120627 A1 | 4/2015 | Hunzinger et al. |
| 2015/0254344 A1 | 9/2015 | Kulkarni et al. |
| 2015/0286742 A1 | 10/2015 | Zhang et al. |
| 2015/0289022 A1 | 10/2015 | Gross |
| 2015/0324356 A1 | 11/2015 | Gutierrez et al. |
| 2016/0007083 A1 | 1/2016 | Gurha |
| 2016/0026707 A1 | 1/2016 | Ong et al. |
| 2016/0306798 A1 | 10/2016 | Guo et al. |
| 2017/0017638 A1 | 1/2017 | Satyavarta et al. |
| 2017/0154241 A1 | 6/2017 | Shambik et al. |

FOREIGN PATENT DOCUMENTS

| | | |
|---|---|---|
| WO | 0231764 | 4/2002 |
| WO | 0231764 A2 | 4/2002 |
| WO | 2003005242 A1 | 1/2003 |
| WO | 2003067467 A1 | 8/2003 |
| WO | 2004019527 A1 | 3/2004 |
| WO | 2005027457 A1 | 3/2005 |
| WO | 2007049282 A2 | 5/2007 |
| WO | 2014076002 A1 | 5/2014 |
| WO | 2014137337 A1 | 9/2014 |
| WO | 2016040376 A1 | 3/2016 |
| WO | 2016070193 A1 | 5/2016 |

OTHER PUBLICATIONS

Scheper et al, "Nonlinear dynamics in neural computation", ESANN'2006 proceedings—European Symposium on Artificial Neural Networks, Bruges (Belgium), Apr. 26-28, 2006, d-side publi, ISBN 2-930307-06-4.

Semizarov et al. "Specificity of Short Interfering RNA Determined through Gene Expression Signatures", PNAS, 2003, pp. 6347-6352.

Shih-Fu Chang, et al., "VideoQ: A Fully Automated Video Retrieval System Using Motion Sketches", 1998, IEEE, , New York, pp. 1-2.

The International Search Report and the Written Opinion for PCT/US2016/050471, ISA/RU, Moscow, RU, dated May 4, 2017.

The International Search Report and the Written Opinion for PCT/US2016/054634 dated Mar. 16, 2017, ISA/RU, Moscow, RU.

The International Search Report and the Written Opinion for PCT/US2017/015831, ISA/RU, Moscow, Russia, dated Apr. 20, 2017.

Theodoropoulos et al, "Simulating Asynchronous Architectures on Transputer Networks", Proceedings of the Fourth Euromicro Workshop on Parallel and Distributed Processing, 1996. PDP '96.

Vailaya, et al., "Content-Based Hierarchical Classification of Vacation Images," I.E.E.E.: Multimedia Computing and Systems, vol. 1, 1999, East Lansing, MI, pp. 518-523.

Vallet, et al., "Personalized Content Retrieval in Context Using Ontological Knowledge," IEEE Transactions on Circuits and Systems for Video Technology, vol. 17, No. 3, Mar. 2007, pp. 336-346.

Verstraeten et al., "Isolated word recognition with the Liquid State Machine: a case study"; Department of Electronics and Information Systems, Ghent University, Sint-Pietersnieuwstraat 41, 9000 Gent, Belgium, Available online Jul. 14, 2005.

Verstraeten et al.: "Isolated word recognition with the Liquid State Machine: a case study", Information Processing Letters, Amsterdam, NL, vol. 95, No. 6, Sep. 30, 2005 (Sep. 30, 2005), pp. 521-528, XP005028093 ISSN: 0020-0190.

Wang et al. "A Signature for Content-based Image Retrieval Using a Geometrical Transform", ACM 1998, pp. 229-234.

Wei-Te Li et al., "Exploring Visual and Motion Saliency for Automatic Video Object Extraction", IEEE, vol. 22, No. 7, Jul. 2013, pp. 1-11.

Whitby-Strevens, "The Transputer", 1985 IEEE, Bristol, UK.

Wilk, et al., "The Potential of Social-Aware Multimedia Prefetching on Mobile Devices", 2015 International Conference and Workshops on Networked Systems (NetSys) Year: 2015, pp. 1-5, DOI: 10.1109/NetSys.2015.7089081 IEEE Conference Publications.

Xian-Sheng Hua et al.: "Robust Video Signature Based on Ordinal Measure" In: 2004 International Conference on Image Processing, ICIP '04; Microsoft Research Asia, Beijing, China; published Oct. 24-27, 2004, pp. 685-688.

Yanai, "Generic Image Classification Using Visual Knowledge on the Web," MM'03, Nov. 2-8, 2003, Tokyo, Japan, pp. 167-176.

Zang, et al., "A New Multimedia Message Customizing Framework for Mobile Devices", Multimedia and Expo, 2007 IEEE International Conference on Year: 2007, pp. 1043-1046, DOI: 10.1109/ICME.2007.4284832 IEEE Conference Publications.

Zeevi, Y. et al.: "Natural Signal Classification by Neural Cliques and Phase-Locked Attractors", IEEE World Congress on Computational Intelligence, IJCNN2006, Vancouver, Canada, Jul. 2006 (Jul. 2006), XP002466252.

Zhou et al., "Ensembling neural networks: Many could be better than all"; National Laboratory for Novel Software Technology, Nanjing Unviersirty, Hankou Road 22, Nanjing 210093, PR China; Received Nov. 16, 2001, Available online Mar. 12, 2002.

Zhou et al., "Medical Diagnosis With C4.5 Rule Preceded by Artificial Neural Network Ensemble"; IEEE Transactions on Information Technology in Biomedicine, vol. 7, Issue: 1, pp. 37-42, Date of Publication: Mar. 2003.

Zhu et al., Technology-Assisted Dietary Assessment. Computational Imaging VI, edited by Charles A. Bauman, Eric L. Miller, Ilya Pollak, Proc. of SPIE—IS&T Electronic Imaging, SPIE vol. 6814, 681411, Copyright 2008 SPIE—IS&T. pp. 1-10.

Boari et al, "Adaptive Routing for Dynamic Applications in Massively Parallel Architectures", 1995 IEEE, Spring 1995.

Brecheisen, et al., "Hierarchical Genre Classification for Large Music Collections", ICME 2006, pp. 1385-1388.

Cernansky et al., "Feed-forward Echo State Networks"; Proceedings of International Joint Conference on Neural Networks, Montreal, Canada, Jul. 31-Aug. 4, 2005.

Chuan-Yu Cho, et al., "Efficient Motion-Vector-Based Video Search Using Query by Clip", 2004, IEEE, Taiwan, pp. 1-4.

Clement, et al. "Speaker Diarization of Heterogeneous Web Video Files: A Preliminary Study", Acoustics, Speech and Signal Processing (ICASSP), 2011, IEEE International Conference on Year: 2011, pp. 4432-4435, DOI: 10.1109/ICASSP.2011.5947337 IEEE Conference Publications, France.

Cococcioni, et al, "Automatic Diagnosis of Defects of Rolling Element Bearings Based on Computational Intelligence Techniques", University of Pisa, Pisa, Italy, 2009.

Emami, et al, "Role of Spatiotemporal Oriented Energy Features for Robust Visual Tracking in Video Surveillance, University of Queensland", St. Lucia, Australia, 2012.

Fathy et al., "A Parallel Design and Implementation for Backpropagation Neural Network Using NIMD Architecture", 8th Mediterranean

(56) References Cited

OTHER PUBLICATIONS

Electrotechnical Corsfe rersce, 19'96. MELECON '96, Date of Conference: May 13-16, 1996, vol. 3, pp. 1472-1475.
Foote, Jonathan et al., "Content-Based Retrieval of Music and Audio"; 1997, Institute of Systems Science, National University of Singapore, Singapore (Abstract).
Gomes et al., "Audio Watermaking and Fingerprinting: For Which Applications?" University of Rene Descartes, Paris, France, 2003.
Gong, et al., "A Knowledge-based Mediator for Dynamic Integration of Heterogeneous Multimedia Information Sources", Video and Speech Processing, 2004, Proceedings of 2004 International Symposium on Year: 2004, pp. 467-470, DOI: 10.1109/ISIMP.2004.1434102 IEEE Conference Publications, Hong Kong.
Guo et al, "AdOn: An Intelligent Overlay Video Advertising System", SIGIR, Boston, Massachusetts, Jul. 19-23, 2009.
Howlett et al., "A Multi-Computer Neural Network Architecture in a Virtual Sensor System Application", International Journal of Knowledge-based Intelligent Engineering Systems, 4 (2). pp. 86-93, 133N 1327-2314; first submitted Nov. 30, 1999; revised version submitted Mar. 10, 2000.
Ihab Al Kabary, et al., "SportSense: Using Motion Queries to Find Scenes in Sports Videos", Oct. 2013, ACM, Switzerland, pp. 1-3.
International Search Authority: "Written Opinion of the International Searching Authority" (PCT Rule 43bis.1) including International Search Report for International Patent Application No. PCT/US2008/073852; dated Jan. 28, 2009.
International Search Authority: International Preliminary Report on Patentability (Chapter I of the Patent Cooperation Treaty) including "Written Opinion of the International Searching Authority" (PCT Rule 43bis. 1) for the corresponding International Patent Application No. PCT/IL2006/001235; dated Jul. 28, 2009.
International Search Report for the corresponding International Patent Application PCT/IL2006/001235; dated Nov. 2, 2008.
IPO Examination Report under Section 18(3) for corresponding UK application No. GB1001219.3, dated Sep. 12, 2011.
Iwamoto, K.; Kasutani, E.; Yamada, A.; , "Image Signature Robust to Caption Superimposition for Video Sequence Identification," Image Processing, 2006 IEEE International Conference on, vol., No., pp. 3185-3188, Oct. 8-11, 2006 doi: 10.1109/ICIP.2006.313046URL:http://ieeexplore.ieee.org/stamp/stamp.jsp?tp=&arnumber=4107247&isnumber=4106440.
Jaeger, H.: "The "echo state" approach to analysing and training recurrent neural networks", GMD Report, No. 148, 2001, pp. 1-43, XP002466251 German National Research Center for Information Technology.
Jianping Fan et al., "Concept-Oriented Indexing of Video Databases: Towards Semantic Sensitive Retrieval and Browsing", IEEE, vol. 13, No. 7, Jul. 2004, pp. 1-19.
Johnson, John L., "Pulse-Coupled Neural Nets: Translation, Rotation, Scale, Distortion, and Intensity Signal Invariance for Images." Applied Optics, vol. 33, No. 26, 1994, pp. 6239-6253.
Lau, et al., "Semantic Web Service Adaptation Model for a Pervasive Learning Scenario", 2008 IEEE Conference on Innovative Technologies in Intelligent Systems and Industrial Applications Year: 2008, pp. 98-103, DOI: 10.1109/CITISIA.2008.4607342 IEEE Conference Publications.
Li, et al., "Matching Commercial Clips from TV Streams Using a Unique, Robust and Compact Signature," Proceedings of the Digital Imaging Computing: Techniques and Applications, Feb. 2005, vol. 0-7695-2467, Australia.
Lin, C.; Chang, S.;, "Generating Robust Digital Signature for Image/Video Authentication," Multimedia and Security Workshop at ACM Multimedia '98. Bristol, U.K. Sep. 1998, pp. 49-54.
Lin, et al., "Robust Digital Signature for Multimedia Authentication: A Summary", IEEE Circuits and Systems Magazine, 4th Quarter 2003, pp. 23-26.
Lin, et al., "Summarization of Large Scale Social Network Activity", Acoustics, Speech and Signal Processing, 2009, ICASSP 2009, IEEE International Conference on Year 2009, pp. 3481-3484, DOI: 10.1109/ICASSP.2009.4960375, IEEE Conference Publications, Arizona.
Liu, et al., "Instant Mobile Video Search With Layered Audio-Video Indexing and Progressive Transmission", Multimedia, IEEE Transactions on Year: 2014, vol. 16, Issue: 8, pp. 2242-2255, DOI: 10.1109/TMM.2014.2359332 IEEE Journals & Magazines.
Lyon, Richard F.; "Computational Models of Neural Auditory Processing"; IEEE International Conference on Acoustics, Speech, and Signal Processing, ICASSP '84, Date of Conference: Mar. 1984, vol. 9, pp. 41-44.
Maass W. et al.: "Computational Models for Generic Cortical Microcircuits", Institute for Theoretical Computer Science, Technische Universitaet Graz, Graz, Austria, published Jun. 10, 2003.
Mandhaoui, et al, "Emotional Speech Characterization Based on Multi-Features Fusion for Face-to-Face Interaction", Universite Pierre et Marie Curie, Paris, France, 2009.
Marti et al, "Real Time Speaker Localization and Detection System for Camera Steering in Multiparticipant Videoconferencing Environments", Universidad Politecnica de Valencia, Spain, 2011.
May et al., "The Transputer", Springer-Verlag, Berlin Heidelberg, 1989, teaches multiprocessing system.
McNamara, et al., "Diversity Decay in Opportunistic Content Sharing Systems", 2011 IEEE International Symposium on a World of Wireless, Mobile and Multimedia Networks Year: 2011, pp. 1-3, DOI: 10.1109/WoWMoM.2011.5986211 IEEE Conference Publications.
Mei, et al., "Contextual In-Image Advertising", Microsoft Research Asia, pp. 439-448, 2008.
Mei, et al., "VideoSense—Towards Effective Online Video Advertising", Microsoft Research Asia, pp. 1075-1084, 2007.
Mladenovic, et al., "Electronic Tour Guide for Android Mobile Platform with Multimedia Travel Book", Telecommunications Forum (TELFOR), 2012 20th Year: 2012, pp. 1460-1463, DOI: 10.1109/TELFOR.2012.6419494 IEEE Conference Publications.
Morad, T.Y. et al.: "Performance, Power Efficiency and Scalability of Asymmetric Cluster Chip Multiprocessors", Computer Architecture Letters, vol. 4, Jul. 4, 2005 (Jul. 4, 2005), pp. 1-4, XP002466254.
Nagy et al, "A Transputer, Based, Flexible, Real-Time Control System for Robotic Manipulators", UKACC International Conference on Control '96, Sep. 2-5, 1996, Conference 1996, Conference Publication No. 427, IEE 1996.
Nam, et al., "Audio Visual Content-Based Violent Scene Characterization", Department of Electrical and Computer Engineering, Minneapolis, MN, 1998, pp. 353-357.
Natsclager, T. et al.: "The "liquid computer": A novel strategy for real-time computing on time series", Special Issue on Foundations of Information Processing of Telematik, vol. 8, No. 1, 2002, pp. 39-43, XP002466253.
Nouza, et al., "Large-scale Processing, Indexing and Search System for Czech Audio-Visual Heritage Archives", Multimedia Signal Processing (MMSP), 2012, pp. 337-342, IEEE 14th Intl. Workshop, DOI: 10.1109/MMSP.2012.6343465, Czech Republic.
Odinaev, et al., "Cliques in Neural Ensembles as Perception Carriers", Technion—Israel Institute of Technology, 2006 International Joint Conference on Neural Networks, Canada, 2006, pp. 285-292.
Ortiz-Boyer et al., "CIXL2: A Crossover Operator for Evolutionary Algorithms Based on Population Features", Journal of Artificial Intelligence Research 24 (2005) 1-48 Submitted Nov. 2004; published Jul. 2005.
Park, et al., "Compact Video Signatures for Near-Duplicate Detection on Mobile Devices", Consumer Electronics (ISCE 2014), The 18th IEEE International Symposium on Year: 2014, pp. 1-2, DOI: 10.1109/ISCE.2014.6884293 IEEE Conference Publications.
Raichelgauz, I. et al.: "Co-evolutionary Learning in Liquid Architectures", Lecture Notes in Computer Science, [Online] vol. 3512, Jun. 21, 2005 (Jun. 21, 2005), pp. 241-248, XP019010280 Springer Berlin / Heidelberg ISSN: 1611-3349 ISBN: 978-3-540-26208-4.
Ribert et al. "An Incremental Hierarchical Clustering", Visicon Interface 1999, pp. 586-591.
Ma Et El. ("Semantics modeling based image retrieval system using neural networks" 2005 (Year: 2005).

(56) References Cited

OTHER PUBLICATIONS

"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation for Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International Journal of knowledge-based intelligent engineering systems, 4 (2). pp. 86-93, 133N 1327-2314.
Hua et al., "Robust Video Signature Based on Ordinal Measure", Image Processing, 2004, 2004 International Conference on Image Processing (ICIP), vol. 1, IEEE, pp. 685-688, 2004.
International Search Report and Written Opinion for PCT/US2016/050471, ISA/RU, Moscow, RU, dated May 4, 2017.
International Search Report and Written Opinion for PCT/US2016/054634, ISA/RU, Moscow, RU, dated Mar. 16, 2017.
International Search Report and Written Opinion for PCT/US2017/015831, ISA/RU, Moscow, RU, dated Apr. 20, 2017.
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.
Morad et al., "Performance, Power Efficiency and Scalability of Asymmetric Cluster Chip Multiprocessors", Computer Architecture Letters, vol. 4, Jul. 4, 2005, pp. 1-4, XP002466254.
Nagy et al, "A Transputer, Based, Flexible, Real-Time Control System for Robotic Manipulators", UKACC International Conference on Control '96, Sep. 2-5, 1996, Conference Publication No. 427, IEE 1996.
Natschlager et al., "The "Liquid Computer": A novel strategy for real-time computing on time series", Special Issue on Foundations of Information Processing of telematik, vol. 8, No. 1, 2002, pp. 39-43, XP002466253.
Odinaev et al, "Cliques in Neural Ensembles as Perception Carriers", Technion—Institute of Technology, 2006 International Joint Conference on neural Networks, Canada, 2006, pp. 285-292.
Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.
Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).
Queluz, "Content-Based Integrity Protection of Digital Images", SPIE Conf. on Security and Watermarking of Multimedia Contents, San Jose, Jan. 1999, pp. 85-93.
Rui, Yong et al. "Relevance feedback: a power tool for interactive content-based image retrieval." IEEE Transactions on circuits and systems for video technology 8.5 (1998): 644-655.
Santos et al., "SCORM-MPEG: an Ontology of Interoperable Metadata for multimediaand E-Learning", 23rd International Conference on Software, Telecommunications and Computer Networks (SoftCom), 2015, pp. 224-228.
Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.
Schneider et al, "A Robust Content based Digital Signature for Image Authentication", Proc. ICIP 1996, Lausane, Switzerland, Oct. 1996, pp. 227-230.
Srihari et al., "Intelligent Indexing and Semantic Retrieval of Multimodal Documents", Kluwer Academic Publishers, May 2000, vol. 2, Issue 2-3, pp. 245-275.
Srihari, Rohini K. "Automatic indexing and content-based retrieval of captioned images" Computer 0 (1995): 49-56.
Stolberg et al ("Hibrid-SOC: A Multi-Core SOC Architecture for Multimedia Signal Processing" 2003).
Stolberg et al, "Hibrid-SOC: A Mul Ti-Core SOC Architecture for Mul Timedia Signal Processing", 2003 IEEE, pp. 189-194.
Theodoropoulos et al, "Simulating Asynchronous Architectures on Transputer Networks", Proceedings of the Fourth Euromicro Workshop on Parallel and Distributed Processing, 1996. PDP '96, pp. 274-281.
Vallet et al ("Personalized Content Retrieval in Context Using Ontological Knowledge" Mar. 2007) (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.

(56) References Cited

OTHER PUBLICATIONS

Yanagawa et al, "Columbia University's Baseline Detectors for 374 LSCOM Semantic Visual Concepts", Columbia University Advent Technical Report # 222-2006-8, Mar. 20, 2007, pp. 1-17.
Yanagawa et al., "Columbia University's Baseline Detectors for 374 LSCOM Semantic Visual Concepts", Columbia University Advent Technical Report #222, 2007, pp. 2006-2008.
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.

\* cited by examiner

METHOD AND SYSTEM FOR POPULATING A CONCEPT DATABASE WITH RESPECT TO USER IDENTIFIERS

CROSS-REFERENCE TO RELATED APPLICATIONS

This application claims the benefit of U.S. Provisional Application No. 62/360,980 filed on Jul. 12, 2016. This applications are incorporated herein by reference: U.S. patent application Ser. No. 14/597,324 filed on Jan. 15, 2015, now abandoned, which claims the benefit of U.S. Provisional Application No. 61/928,468, filed on Jan. 17, 2014. U.S. patent application Ser. No. 13/766,463 filed on Feb. 13, 2013, now U.S. Pat. No. 9,031,999. U.S. patent application Ser. No. 13/602,858 filed on Sep. 4, 2012, now U.S. Pat. No. 8,868,619. U.S. patent application Ser. No. 12/603,123 filed on Oct. 21, 2009, now U.S. Pat. No. 8,266,185, U.S. patent application Ser. No. 12/084,150 having a filing date of Apr. 7, 2009, now U.S. Pat. No. 8,655,801, which is the National Stage of International Application No. PCT/IL2006/001235 filed on Oct. 26, 2006; U.S. patent application Ser. No. 12/195,863 filed on Aug. 21, 2008, now U.S. Pat. No. 8,326,775, U.S. patent application Ser. No. 12/348,888, filed on Jan. 5, 2009, U.S. patent application Ser. No. 12/538,495, filed on Aug. 10, 2009, now U.S. Pat. No. 8,312,031.

TECHNICAL FIELD

The present disclosure relates generally to the analysis of multimedia content, and more specifically to creating a concept database with respect to user identifiers.

BACKGROUND

With the abundance of data made available through various means in general and, in particular, through the Internet and world-wide web (WWW), there is a need for efficient management of multimedia content. Searching and organizing multimedia content generally, and videos in particular, are challenging at best due to difficulties in representing the content and comparing the information indicated by the content. Further, searching and organizing multimedia content becomes even more challenging as the amount of content available increases.

Some existing solutions for organizing and searching for multimedia content utilize metadata to represent the content that can be compared to textual inputs (e.g., queries) to determine whether multimedia content is relevant. However, such metadata may be incomplete or inaccurate, thereby resulting in ineffective organization and searching. Specifically, the metadata may not represent all aspects of the content, particularly abstract or otherwise more complex aspects. For example, metadata of an image showing a car may indicate the presence of the car, but may not indicate the make or model such that any searches for a particular make and model of car do not result in identification of the image. As another example, metadata for an image showing two people may indicate each of the persons but not indicate interactions between the people shown in the image or the underlying meaning of such interactions.

Additionally, the massive amount of content available, for example over the Internet, makes searching for multimedia content a resource-intensive process. As a result, searches are often limited due to resource constraints, or may otherwise take more time to complete.

The rapid increase in multimedia databases in recent years therefore calls for the application of new methods of representing information featured in videos and other multimedia content. In particular, it would be desirable to organize content that is relevant to a particular user. Further, once multimedia content is organized using these new methods of representing information, sharing the content with relevant users would be desirable.

It would be therefore advantageous to provide a solution that overcomes the deficiencies of the prior art.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some embodiments may be used herein to refer to a single embodiment or multiple embodiments of the disclosure.

Certain embodiments disclosed herein include a method for populating a concept database based on a plurality of multimedia data elements (MMDEs) and at least one user identifier, the concept database including a plurality of concept structures. The method comprises: clustering a plurality of signatures of the plurality of MMDEs into a cluster of signatures; reducing the number of signatures in the cluster to a create a signature reduced cluster (SRC); generating, based on the SRC and the plurality of concept structures, an index, wherein the index maps the plurality of MMDEs to a matching concept structure of the plurality of concept structures; associating the index with a user based on the at least one user identifier; and storing the index and the plurality of MMDEs in the concept database.

Certain embodiments disclosed herein also include a non-transitory computer readable medium having stored thereon causing a processing circuitry to execute a process, the process comprising: clustering a plurality of signatures of a plurality of MMDEs into a cluster of signatures; reducing the number of signatures in the cluster to a create a signature reduced cluster (SRC); generating, based on the SRC and a plurality of concept structures stored in a concept database, an index, wherein the index maps the plurality of MMDEs to a matching concept structure of the plurality of concept structures; associating the index with a user based on the at least one user identifier; and storing the index and the plurality of MMDEs in the concept database.

Certain embodiments disclosed herein also include a system for populating a concept database based on a plurality of multimedia data elements (MMDEs) and at least one user identifier, the concept database including a plurality of concept structures. The system comprises: a processing circuitry; and a memory, the memory containing instructions that, when executed by the processing circuitry, configure the system to: cluster a plurality of signatures of the plurality of MMDEs into a cluster of signatures; reduce the number of signatures in the cluster to a create a signature reduced cluster (SRC); generate, based on the SRC and the plurality of concept structures, an index, wherein the index maps the plurality of MMDEs to a matching concept structure of the plurality of concept structures; associate the index with a user based on the at least one user identifier; and store the index and the plurality of MMDEs in the concept database.

BRIEF DESCRIPTION OF THE DRAWINGS

The subject matter that disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
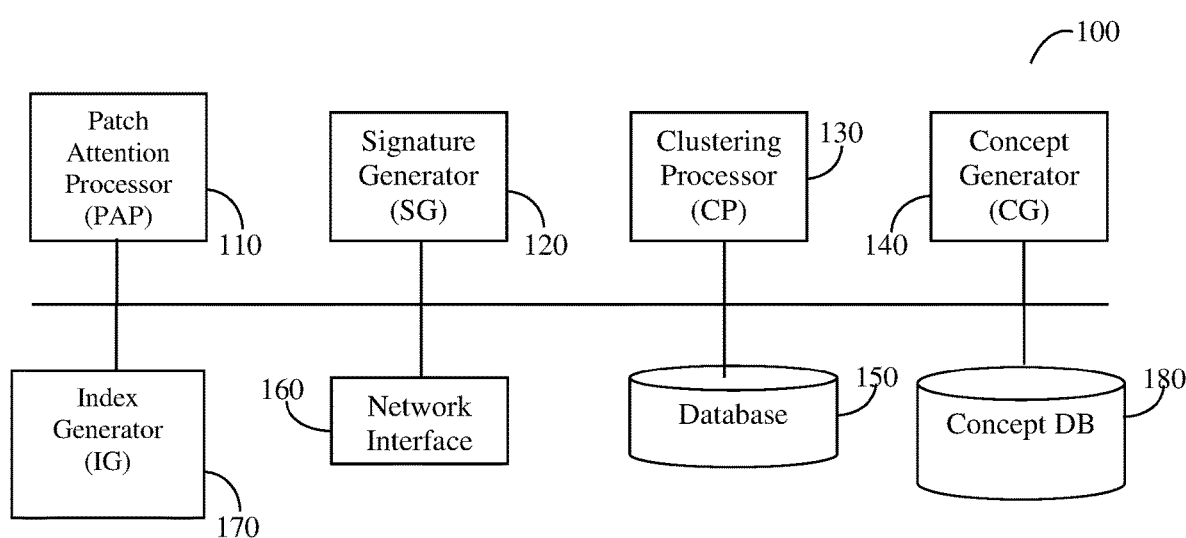
FIG. 1 is a diagram of a deep-content-classification (DCC) system for creating concept structures in accordance with an embodiment.

The embodiments disclosed herein are only examples of the many possible advantageous uses and implementations of the innovative teachings presented herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

A system and method for populating a concept database based on at least one user identifier. Each user identifier may be a multimedia content element representing the user such as, for example, an image showing the user's face. Multimedia data elements (MMDEs) are analyzed and organized in a concept database with respect to signatures of the MMDEs. Signature reduced clusters (SRCs) are created for groupings of the MMDEs. An index mapping each MMDE to a matching concept structure is generated. At least some of the indices are associated with users based on comparison of the user identifiers to signatures of mapped concept structures. Access to an indexed MMDE having an index associated with a user may be granted to that user.

A multimedia deep-content-classification (DCC) system is configured to analyze and organize multimedia content elements. The DCC system initially receives a large number of multimedia data elements (MMDEs) to create a knowledge base that is condensed into concept structures that are efficient to store, retrieve, and check for matches. As new MMDEs are collected, they are efficiently added to the knowledge base and concept structures such that the computing resources requirement for achieving this operation is generally sub-linear rather than linear or exponential. Metadata respective of the MMDEs is thereby produced, forming together with the reduced clusters into a concept structure.

According to one embodiment, the concept DB is comprised of two layers: (a) a concept structures database; and (b) a database of indices of original MMDEs mapped to the concept structures database. The architecture of the concept DB enables an external system to perform content management operations on the indices database because the volume of the indices is lower and, thus, the analysis requires fewer computational resources. All the necessary updates are performed by adding, removing, or updating the concept structures in the concept DB.

The disclosed embodiments allow for organizing a concept database with respect to users. Utilization of signature clusters for organizing and indexing the MMDEs allows for more accurate organization and indexing than, for example, based on manually created metadata alone. Further, use of user identifiers allows for indexing with respect to users featured in the MMDEs. For example, a group of videos showing a user "John Smith" may be mapped to a concept structure representing the concept of John Smith. User identifier images showing John Smith's face, for example images retrieved from a social media profile of John Smith, may be utilized to associate an index of the group of videos showing John Smith with the user John Smith. Access to the portion of the concept database including the John Smith videos may be granted to, for example, a mobile device owned by John Smith.

FIG. 1 shows an example diagram of a DCC system 100 for creating concept structures according to an embodiment. The DCC system 100 includes a patch attention processor (PAP) 110, a signature generator (SG) 120, a clustering processor (CP) 130, a concept generator (CG) 140, a database (DB) 150, a network interface 160, an index generator (IG) 170, and a concept database (DB) 180. The DCC system 100 receives MMDEs from, for example, the Internet via the network interface 160. The MMDEs include, but are not limited to, images, graphics, video streams, video clips, audio streams, audio clips, video frames, photographs, images of signals, combinations thereof, and portions thereof. The images of signals are images featuring signals such as, but not limited to, medical signals, geophysical signals, subsonic signals, supersonic signals, electromagnetic signals, infrared signals, and combinations thereof.

The MMDEs may be stored in the database (DB) 150, and references to each MMDE are kept in the DB 150 for future retrieval of the respective MMDE. Such a reference may be, but is not limited to, a universal resource locator (URL).

Every MMDE in the database 150, or reference thereof, is processed by a patch attention processor (PAP) 110, thereby resulting in a plurality of patches that are of specific interest, or otherwise of higher interest, than other patches. A more general pattern extractor, such as an attention processor (AP), can also be used in lieu of patches. The AP receives the MMDE that is partitioned into items. An item may be an extracted pattern or a patch, or any other applicable partition depending on the type of the MMDE. The functions of the patch attention processor 110 are described further herein below in more detail in FIG. 2. Those patches that are of higher interest are then used by a signature generator (SG) 120 to generate signatures respective of the patch. The operation of the SG 120 is described in more detail herein below with respect to FIG. 4.

A clustering processor (CP) 130 initiates a process of inter-matching of the signatures upon determining that there are a number of patches above a predefined threshold. The threshold may be defined to be large enough to enable proper and meaningful clustering. The value of a threshold that is large enough to enable proper and meaningful clustering may be, for example, predetermined. With a plurality of clusters, a process of clustering reduction takes place so as to extract the most useful data about the cluster and keep it at an optimal size to produce meaningful results. The process of cluster reduction is continuous. When new signatures are provided after the initial phase of the operation of the clustering processor 130, the new signatures may be immediately checked against the reduced clusters to minimize the number of necessary inter-matches in future operations of the clustering processor 130. A more detailed description of the operation of the clustering processor 130 is provided herein below in FIG. 5.

A concept generator (CG) 140 creates concept structures from the reduced clusters provided by the cluster processor 130. Each concept structure is comprised of a plurality of metadata associated with the reduced clusters. The result is a compact representation of a concept that can now be easily compared against a MMDE to determine if the received MMDE matches a concept structure stored, for example, in the database 150. This matching operation can be performed by the concept generator 140, for example, and without limitation, by providing a query to the DCC system 100 for finding a match between a concept structure and a MMDE. A more detailed description of the operation of the CG 140 is provided herein below in FIG. 6.

The index generator (IG) 170 is configured to extract metadata related to each of the plurality of MMDEs stored in the database 150 or referenced therefrom. The metadata may include patches created by the patch attention processor 110 for each MMDE. The metadata may also include one or more signatures generated by the signature generator 120 for each MMDE. The metadata may further include the concept structure identified for each of the MMDEs. Based on the metadata extracted, the index generator 170 is configured to generate a plurality of compressed conceptual representations, which will be referred to as indices, for each of the plurality of MMDEs stored in the database 150 or referenced therefrom.

In one embodiment, an index for a MMDE is generated by matching its respective metadata to a plurality of concept structures provided by the concept generator 140. Upon at least one matching concept structure being detected, an index to the matching structure is generated. For example, an image of a tulip would be mapped to a concept structure of "flowers."

In an embodiment, the index generator is further configured to associate one or more of the generated indices with corresponding users based on user identifiers of the users. The user identifiers may be MMDEs featuring representations of the user. For example, a user identifier may be an image or video showing the user's face, an audio clip featuring the user's voice, and the like. To this end, signatures of concept structures associated with the generated indices may be compared to signatures of user identifiers to determine a matching user for one or more of the indices. Each matching user is associated with the corresponding index.

The plurality of indices is then stored in a concept database (DB) 180. The content management operations, such as, but not limited to, data retrieval, search, and so on, are performed using the indices saved in the concept database 180. In certain embodiments, the concept database 180 may be part of the database 150.

According to one embodiment, the concept database 180 includes two layers of data structures (or databases): one is for concept structures, and the other is for indices of the original MMDEs mapped to the concept structures in the concept database 180.

As noted above, a concept structure is a reduced cluster of MMDEs together with their respective metadata. Thus, the DCC system 100 can generate a number of concept structures that is significantly smaller than the number of MMDEs. Therefore, the number of indices required in the concept DB 180 is significantly smaller relative to a solution that requires indexing of raw MMDEs.

The operation of the patch attention processor 110 will now be provided in greater detail with respect to a MMDE in a form of an image. However, this should not be understood as to limit the scope of the disclosed embodiments, as other types of MMDEs are specifically included herein and may be handled by the patch attention processor 110.

Figure 2:
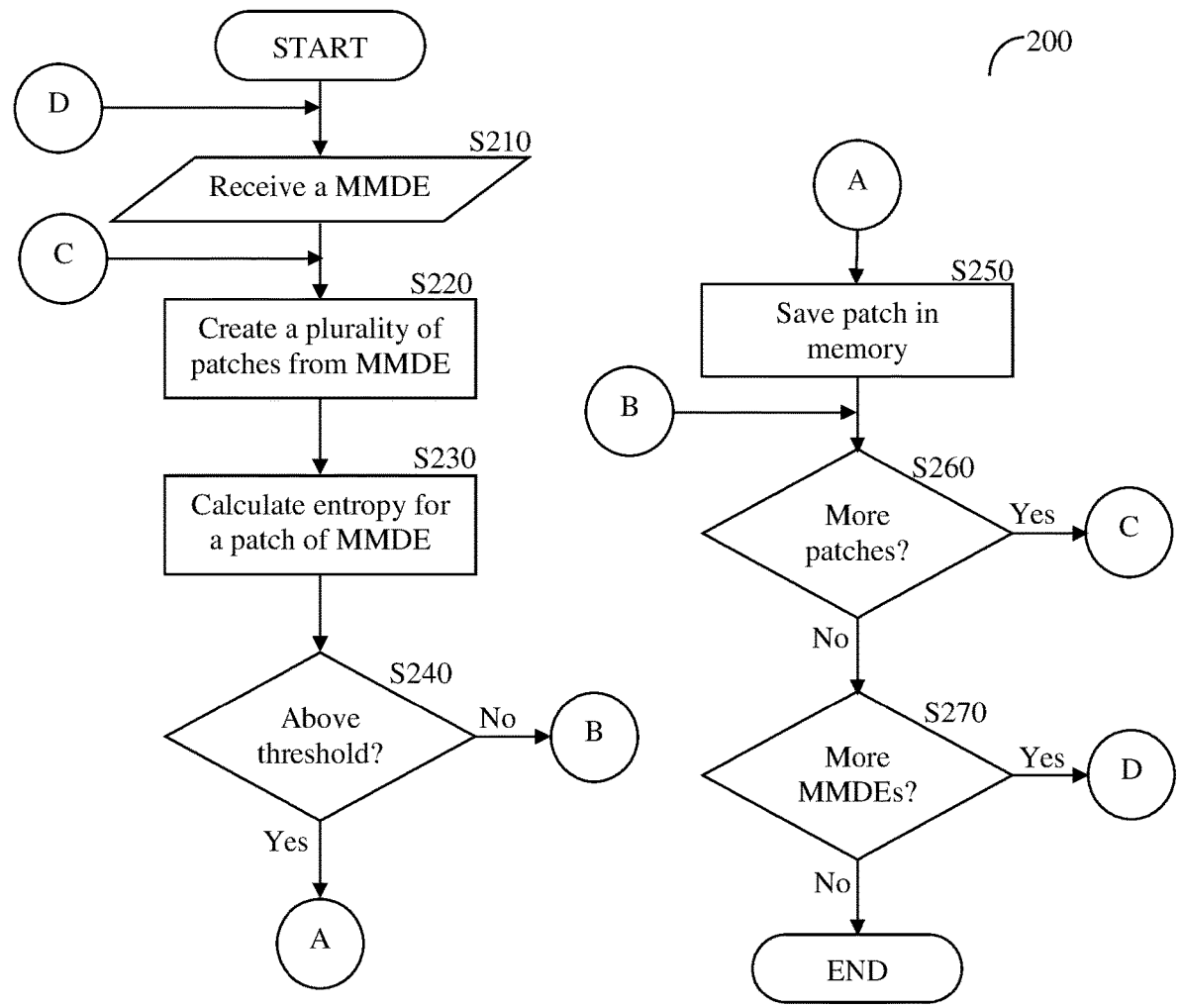
FIG. 2 is a flowchart illustrating the operation of a patch attention processor (PAP) in accordance with an embodiment.

FIG. 2 depicts an example flowchart 200 of the operation of the patch attention processor 110 according to an embodiment. In S210, the patch attention processor 110 receives a MMDE from a source for such MMDEs. Such a source may be a system that feeds the DCC system 100 with MMDEs or other sources for MMDEs such as, for example, the world-wide-web (WWW). In S220, the patch attention processor 110 creates a plurality of patches from the MMDE. A patch of an image is defined by, for example, its size, scale, location, and orientation. A patch may be, for example and without limitation, a portion of an image of a size 20 pixels by 20 pixels, wherein the image is of a size 1,000 pixels by 500 pixels. In the case of audio, a patch may be a segment of audio 0.5 seconds in length from a 5 minute audio clip.

Figure 4:
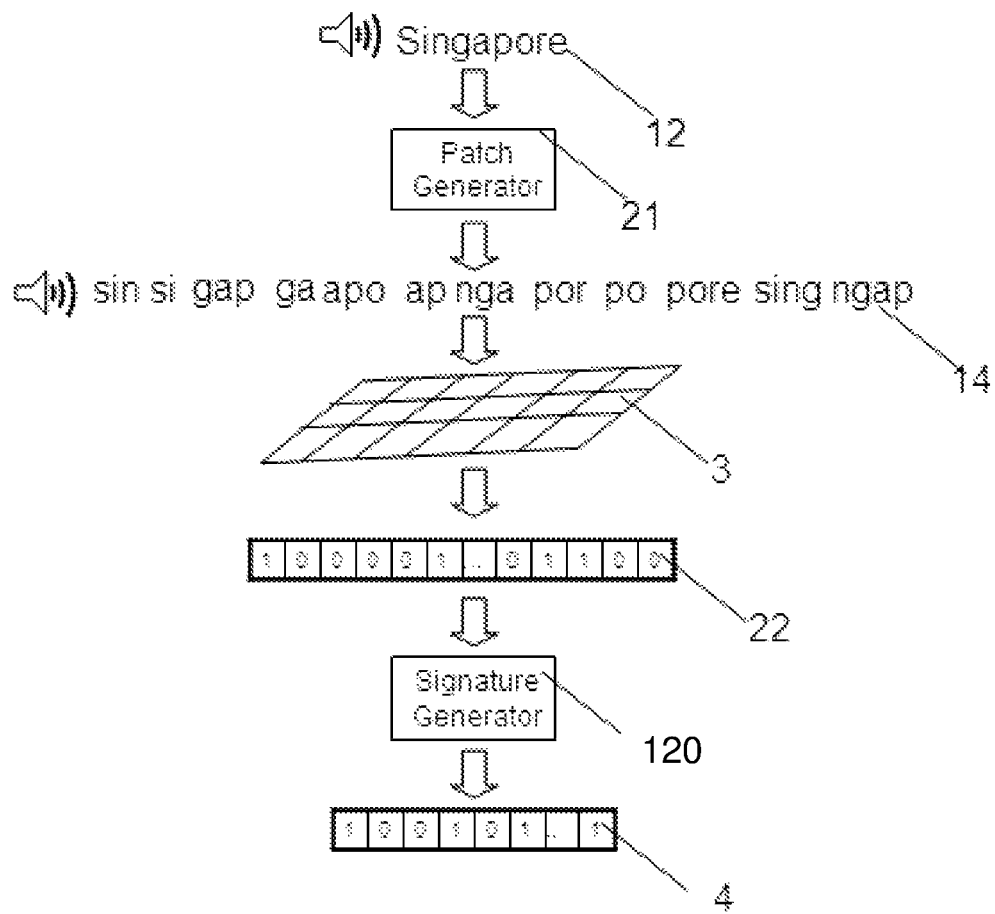
FIG. 4 is a diagram showing the flow of patches generation, response vector generation, and signature generation in a large-scale speech-to-text system.

In S230, a patch not previously checked is processed to determine its entropy. The entropy is a measure of the amount of interesting information that may be present in the patch. For example, a continuous color of the patch has little interest, whereas sharp edges, corners, or borders will result in higher entropy representing a lot of interesting information. In one embodiment, a plurality of statistically independent cores, the operation of which is discussed in more detail herein below with respect to FIG. 4, is used to determine the level of interest of the image, and a process of voting takes place to determine whether the patch is of interest or not.

In S240, it is checked whether the entropy was determined to be above a predefined threshold, and if so execution continues with S250; otherwise, execution continues with S260. In S250 the patch having entropy above the predefined threshold is stored for future use by the SG 120 in, for example, the database 150. In S260, it is checked whether there are more patches of the MMDE to be checked, and if so execution continues with S220; otherwise execution continues with S270. In S270, it is checked whether there are additional MMDEs, and if so execution continues with S210; otherwise, execution terminates. It would be appreciated by those of skill in the art that this process reduces the information that must be handled by the DCC system 100 by focusing on areas of interest in the MMDEs rather than on areas that are less meaningful for the formation of a concept structure.

Figure 3:
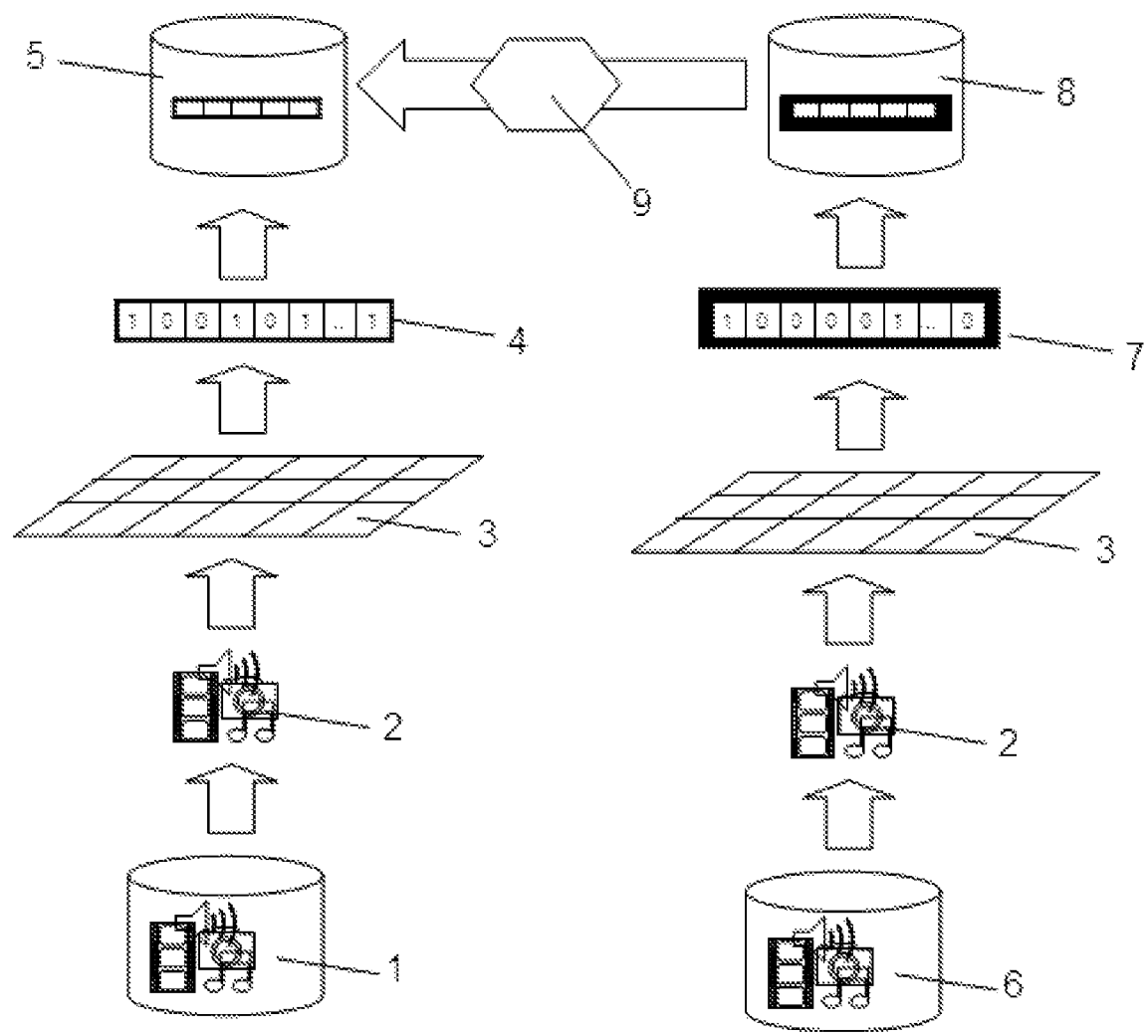
FIG. 3 is a block diagram depicting the basic flow of information in a large-scale video matching system.

A high-level description of the process for large scale video matching performed by a Matching System is depicted in FIG. 3. Video content segments 2 from a Master DB 6 and a Target DB 1 are processed in parallel by a large number of independent computational Cores 3 that constitute the Architecture. Further details on the computational Cores generation are provided below. The independent Cores 3 generate a database of Robust Signatures and Signatures 4 for Target content-segments 5 and a database of Robust Signatures and Signatures 7 for Master content-segments 8. An exemplary and non-limiting process of signature generation for an audio component is shown in detail in FIG. 4. Referring back to FIG. 3, at the final step, Target Robust Signatures and/or Signatures are effectively matched, by a matching algorithm 9, to Master Robust Signatures and/or Signatures database to find all matches between the two databases.

A brief description of the operation of the signature generator 120 is therefore provided, this time with respect to a MMDE which is a sound clip. However, this should not be understood as to limit the scope of the disclosed embodiments and other types of MMDEs that are specifically included herein and may be handled by the signature generator 120. To demonstrate an example of signature generation process, it is assumed, merely for the sake of simplicity and without limitation on the generality of the disclosed embodiments, that the signatures are based on a single frame, leading to certain simplification of the computational core's generation. The Matching System shown in FIG. 3 is extensible for signatures generation capturing the dynamics in-between the frames and the information of the frame's patches.

The signatures generation process is now described with reference to FIG. 4. The first step in the process of signatures generation from a given speech-segment is to break-down the speech-segment into K patches 14 of random length P and random position within the speech segment 12. The break-down is performed by the patch generator component 21. The value of K is determined based on optimization, considering the tradeoff between accuracy rate and the number of fast matches required in the flow process of the System. In the next step, all the K patches are injected in parallel to all L computational Cores 3 to generate K response vectors 22. The vectors 22 are fed into the SG 120 to produce a Signatures and Robust Signatures 4.

In order to generate Robust Signatures, i.e., Signatures that are robust to additive noise L (where L is an integer equal to or greater than 1) computational cores are utilized in the Matching System. A frame i is injected into all the cores. The computational cores 3 generate two binary response vectors: $\vec{S}$ which is a Signature vector, and $\vec{RS}$ which is a Robust Signature vector.

For generation of signatures robust to additive noise, such as White-Gaussian-Noise, scratch, etc., but not robust to distortions, such as crop, shift and rotation, etc., a core $C_i = \{n_i\}$ ($1 \leq i \leq L$) may consist of a single leaky integrate-to-threshold unit (LTU) node or more nodes. The node ni equations are:

$$V_i = \sum_j w_{ij} k_j$$

$n_i = \theta(V_i - TH_x)$; $\theta$ is a Heaviside step function; $w_{ij}$ is a coupling node unit (CNU) between a node i and an image component j (for example, grayscale value of a certain pixel j); $k_j$ is an image component j (for example, grayscale value of a certain pixel j); $Th_x$ is a constant Threshold value, where x is 'S' for Signature and 'RS' for Robust Signature; and $V_i$ is a Coupling Node Value.

The Threshold values $Th_x$ are set differently for Signature generation and for Robust Signature generation. For example, for a certain distribution of $V_i$ values (for the set of nodes), the thresholds for Signature (ThS) and Robust Signature (ThRS) are set apart, after optimization, according to at least one or more of the following criteria:

I: For: $V_i > Th_{RS}$
$1 - p(V > Th_S) - 1 - (1-\varepsilon)^l \ll 1$ i.e., given that I nodes (cores) constitute a Robust Signature of a certain image I, the probability that not all of these I nodes will belong to the Signature of same, but noisy image, $\tilde{I}$ is sufficiently low (according to a system's specified accuracy).

II: $p(V_i > Th_{RS}) \approx l/L$
i.e., approximately I out of the total L nodes can be found to generate Robust Signature according to the above definition.

III: Both Robust Signature and Signature are generated for a certain frame i.

It should be understood that the creation of a signature is a unidirectional compression where the characteristics of the compressed data are maintained but the compressed data cannot be reconstructed. Therefore, a signature can be used for the purpose of comparison to another signature without the need of comparison to the original data. The detailed description of the signature generation can be found U.S. Pat. Nos. 8,326,775 and 8,312,031, assigned to common assignee, which are hereby incorporated by reference for all the useful information they contain.

Computational core generation is a process of definition, selection and tuning of the Architecture parameters for a certain realization in a specific system and application. The process is based on several design considerations, such as: (a) The cores should be designed so as to obtain maximal independence, i.e., the projection from a signal space should generate a maximal pair-wise distance between any two cores' projections into a high-dimensional space; (b) The cores should be optimally designed for the type of signals they process, i.e. the cores should be maximally sensitive to the spatio-temporal structure of the injected signal, for example, and in particular, sensitive to local correlations in time and space. Thus, in some cases a core represents a dynamic system, such as in state space, phase space, edge of chaos, etc., which is uniquely used herein to exploit their maximal computational power, and, (c) The cores should be optimally designed with regard to invariance to a set of signal distortions, of interest in relevant application.

A detailed description of the computational core generation and the process for configuring such cores is discussed in more detail in the above-referenced U.S. patent application Ser. No. 12/084,150, now U.S. Pat. No. 8,655,801, assigned to the common assignee, and is hereby incorporated by reference for all that it contains.

According to certain embodiments, signatures are generated by the signature generator 120 responsive of patches either received from the patch attention processor 110, or retrieved from the database 150. It should be noted that other ways for generating signatures may also be used for the purpose the DCC system 100. Furthermore, as noted above, the array of cores may be used by the patch attention processor 110 for the purpose of determining if a patch has an entropy level that is of interest for signature generation according to the principles of the disclosed embodiments. The generated signatures are stored, for example, in the database 150, with reference to the MMDE and the patch for which it was generated, thereby enabling backward annotation as may be necessary.

Portions of the clustering processor 130 have been discussed in detail in U.S. patent application Ser. No. 12/507,489 (the "489 Application"), now U.S. Pat. No. 8,386,400, entitled "Unsupervised Clustering of Multimedia Data Using a Large-Scale Matching System", filed Jul. 22, 2009, assigned to common assignee, and which is hereby incorporated for all that it contains. In accordance with an embodiment, an inter-match process and clustering thereof is utilized. The process can be performed on signatures provided by the signature generator 120. It should be noted that this inter-matching and clustering process is merely an example for the operation of the clustering processor 130 and other inter-matching and/or clustering processes can also be utilized.

Following is a description of the inter-match and clustering process. The unsupervised clustering process maps a certain content-universe onto a hierarchical structure of clusters. The content-elements of the content-universe are mapped to signatures, when applicable. The signatures of all the content-elements are matched to each other, and consequently generate the inter-match matrix. The described clustering process leads to a set of clusters. Each cluster is represented by a small/compressed number of signatures, for example, signatures generated by the signature generator 120 as further explained hereinabove, which can be increased by variants. This results in a highly compressed representation of the content-universe. In an embodiment, a connection graph between the MMDEs of a cluster may be stored. The graph can then be used to assist a user searching for data to move along the graph in the search of a desired MMDE.

Upon determination of a cluster, a signature for the whole cluster may be generated based on the signatures of the MMDEs that belong to the cluster. It should be appreciated that using a Bloom filter may be used to reach such signatures. Furthermore, as the signatures generated by the signature generator 120 are correlated to some extent, the hash functions of the Bloom filter may be replaced by simpler pattern detectors, with the Bloom filter being the upper limit.

While signatures are used herein as the basic data elements, it should be realized that other data elements may be clustered using the DCC system 100. For example, when a system generating data items is used, the data items generated may be clustered according to the disclosed embodiments. Such data items may be, without limitation, MMDEs. The clustering process may be performed by dedicated hardware or by using a computing device having storage to store the data items generated by the system and configured to perform the process described herein above. Then, the clusters can be stored in memory for use as may be deemed necessary.

The clustering processor 130 further uses an engine designed to reduce the number of signatures used in a structure. This reduction can be performed by extracting only the most meaningful signatures that identify the cluster uniquely. This extraction can be done by testing a removal of a signature from a cluster and checking if the MMDEs associated with the cluster are still capable of being recognized by the cluster through signature matching. The process of signature extraction is continually performed throughout operation of the DCC system 100. It should be noted that, after initialization, upon signature generation by the signature generator 120 of a MMDE, its respective signature is first checked against the clusters to see if there is a match, and if so it may not be necessary to add the signature to the cluster or clusters, but rather simply associate the MMDE with the identified cluster or clusters. However, in some cases where additional refinement of the concept structure is possible, the signature may be added, or at times even replace one or more of the existing signatures in the reduced cluster. If no match is found, the process of inter-matching and clustering may take place.

Figure 5:
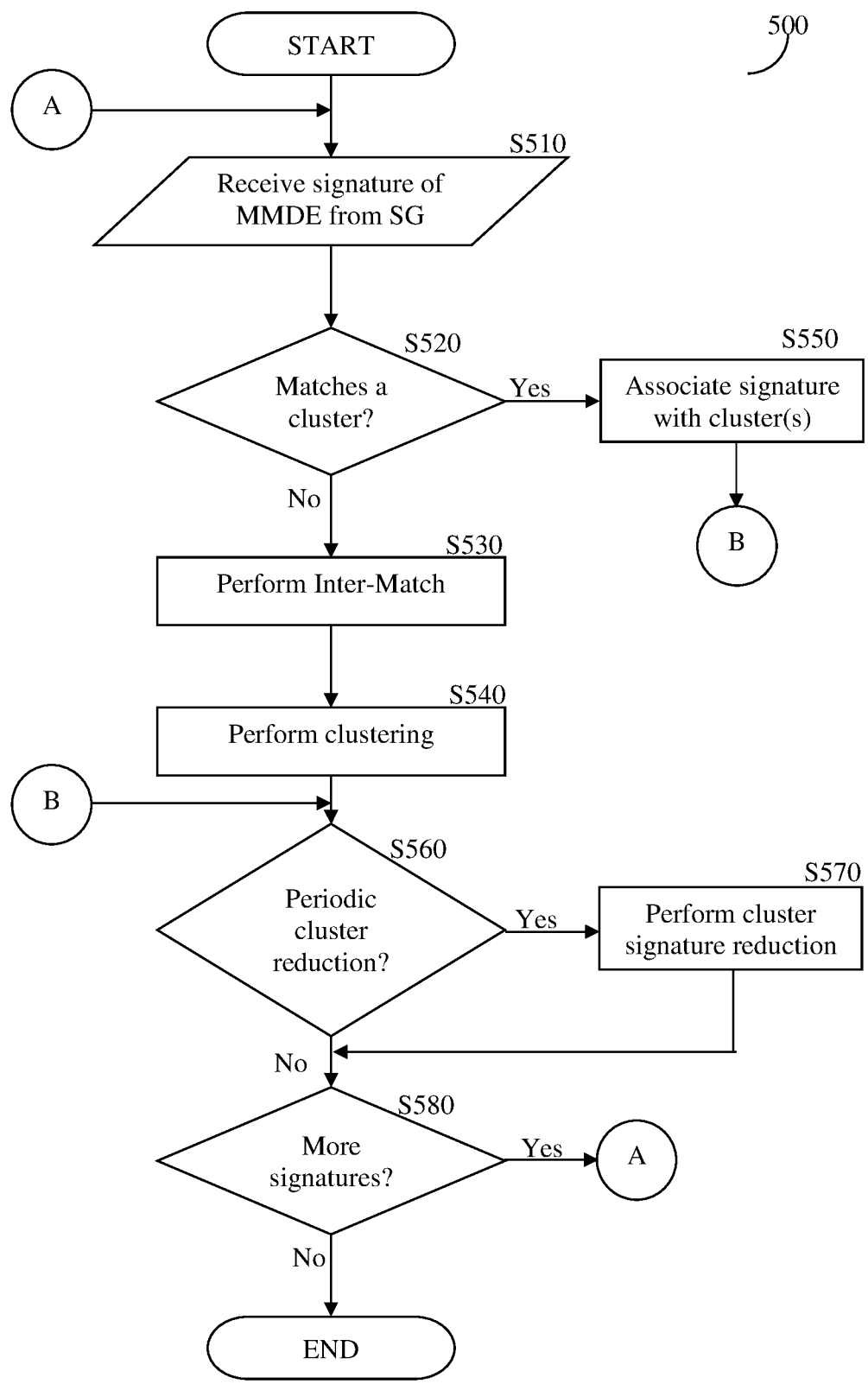
FIG. 5 is a flowchart illustrating the operation of the clustering processor (CP) in accordance with one embodiment.

FIG. 5 depicts an example flowchart 500 of the operation of the clustering processor 130 according to an embodiment. In S510, a signature of a MMDE is received, for example from the signature generator 120. In S520, it is checked whether the received signature matches one or more existing clusters and, if so, execution continues with S550; otherwise, execution continues with S530. In S530, an inter-match between a plurality of signatures previously received by the DCC system 100 is performed, for example in accordance with the principles of the '489 Application. As may be necessary, the database 150 may be used to store results or intermediate results as the case may be, however, other memory elements may also be used. In S540, clustering is performed, for example, as discussed in the '489 Application. As may be necessary, the database 150 may be used to store results or intermediate results as the case may be, however, other memory elements may be used for this purpose as well.

In S550, the signature identified to match one or more clusters is associated with the existing cluster(s). In S560, it is checked whether a periodic cluster reduction is to be performed, and if so execution continues with S570; otherwise, execution continues with S580. In S570, cluster reduction is performed. Specifically, to the cluster reduction ensures that in the cluster remains the minimal number of signatures that still identify all of the MMDEs that are associated with the signature reduced cluster (SRC). This can be performed, for example, by attempting to match the signatures of each of the MMDEs associated with the SRC having one or more signatures removed therefrom. If all of the signatures of MMDEs still match the cluster, then appropriate cluster reduction was performed. The process of cluster reduction for the purpose of generating SRCs is performed in parallel and independent of the process described herein above. In such a case, after either S560 or S570, the operation of S580 takes place.

In S580, it is checked whether there are additional signatures to be processed and, if so, execution continues with S510; otherwise, execution terminates. SRCs may be stored in memory, such as the database 150, for the purpose of being used by other elements of the DCC system 100.

The concept generator 140 performs two tasks: it associates metadata with the SRCs provided by the clustering processor 130, and it associates between similar clusters based on commonality of metadata. Exemplary and non-limiting methods for associating metadata with MMDEs is described in U.S. patent application Ser. No. 12/348,888 (the "'888 Application"), entitled "Methods for Identifying Relevant Metadata for Multimedia Data of a Large-Scale Matching System", filed on Jan. 5, 2009, assigned to common assignee, and which is hereby incorporated for all that it contains. One embodiment of the '888 Application includes a method for identifying and associating metadata to input MMDEs. The method comprises comparing an input first MMDE to at least a second MMDE; collecting metadata of at least the second MMDE when a match is found between the first MMDE and at least the second MMDE; associating at least a subset of the collected metadata to the first MMDE; and storing the first MMDE and the associated metadata in a storage.

Another embodiment of the '888 Application includes a system for collecting metadata for a first MMDE. The system comprises a plurality of computational cores enabled to receive the first MMDE, each core having properties statistically independent of each other core, each core generates responsive to the first MMDE a first signature element and a second signature element, the first signature element being a robust signature; a storage unit for storing at least a second MMDE, metadata associated with the second MMDE, and at least one of a first signature and a second signature associated with the second MMDE, the first signature being a robust signature; and a comparison unit for comparing signatures of MMDEs coupled to the plurality of computational cores and further coupled to the storage unit for the purpose of determining matches between multimedia data elements; wherein responsive to receiving the first MMDE the plurality of computational cores generate a respective first signature of said first MMDE and/or a second signature of said first MMDE, for the purpose of determining a match with at least a second MMDE stored in the storage and associating metadata associated with at least the second MMDE with the first MMDE.

Similar processes to match metadata with a MMDE or signatures thereof can also be utilized, however, these should be viewed only as exemplary and non-limiting implementations, and other methods of operation may be used with respect to the DCC system 100 without departing from the scope of the disclosed embodiments. Accordingly, each SRC is associated with metadata which is the combination of the metadata associated with each of the signatures that are included in the respective SRC, preferably without repetition of metadata. A plurality of SRCs having metadata may then be associated to each other based on the metadata and/or partial match of signatures. For example, and without limitation, if the metadata of a first SRC and the metadata of a second SRC overlap more than a predetermined threshold level (for example, by 50% of the metadata match) they may be considered associated clusters that form a concept structure. Similarly, a second threshold level can be used to determine if there is an association between two SRCs where at least a number of signatures above the second threshold are identified as a match with another SRC. As a non-limiting example, consider the concept of Abraham Lincoln where images of the late President and features thereof appear in a large variety of photographs, drawings, paintings, sculptures, and more, and are associated as a concept structure of the concept "Abraham Lincoln". Each concept structure may then be stored in memory, for example, the database 150, for further use.

Figure 6:
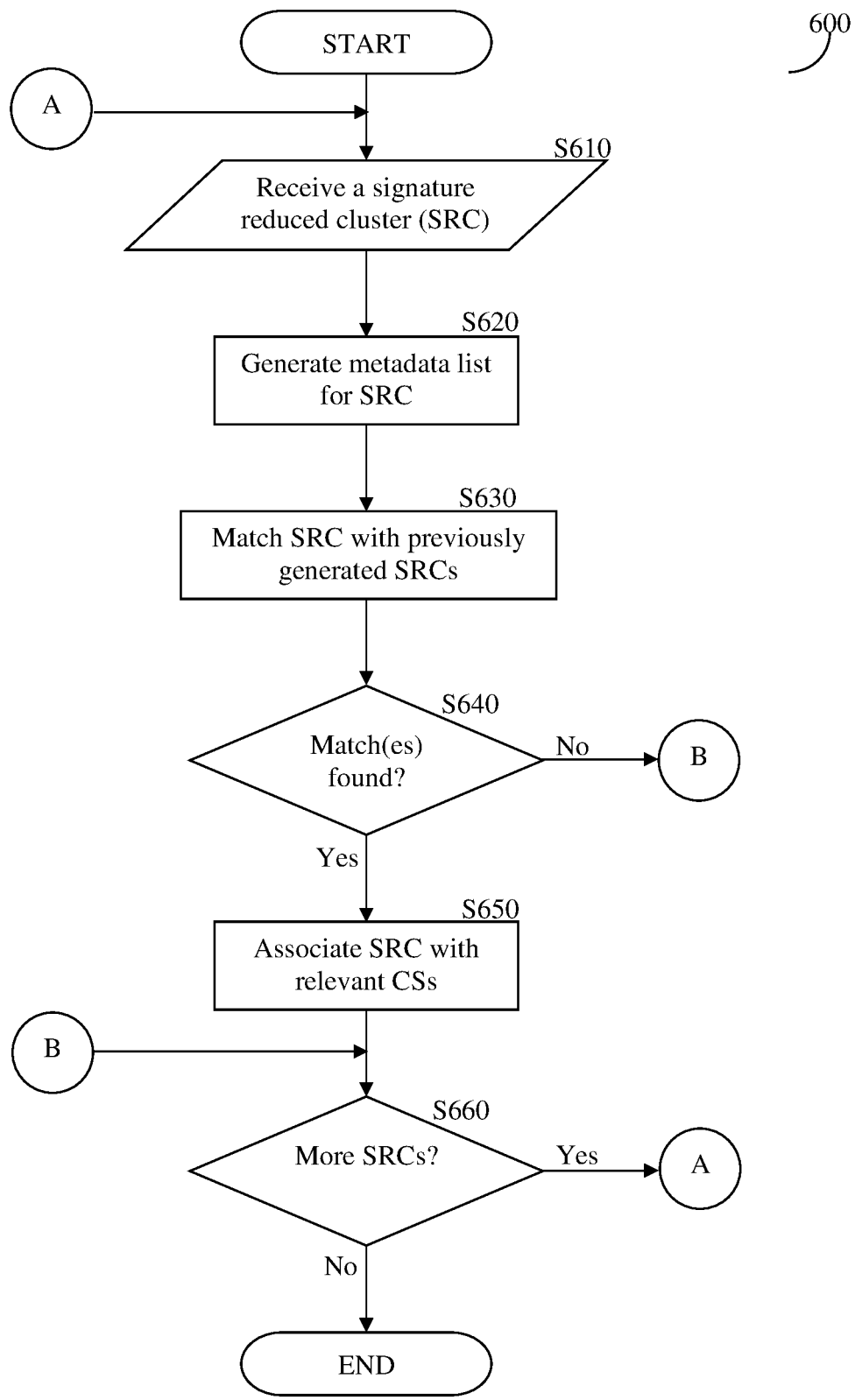
FIG. 6 is a flowchart illustrating the operation of the concept generator in accordance with one embodiment.

FIG. 6 shows an example flowchart 600 of the operation of the concept generator 140 according to an embodiment. In S610, a SRC is received. In an embodiment, the SRC may be received either from the clustering processor 130 or by accessing, for example, the database 150. In S620, metadata are generated for the signatures of the SRC. The process for generating metadata for the SRC is described in further detail herein above. A list of the metadata is created for the SRC preferably with no metadata duplication. In one embodiment, the commonality of metadata is used to signify the strength of the metadata with respect to a signature and/or to the SRC, i.e., a higher number of metadata repetitions is of more importance to the SRC than a lower number of repetitions. Furthermore, in one embodiment, a threshold may be used to remove those metadata that have a significantly low rate of repetition as not being representative of the SRC.

In S630, the SRC is matched to previously generated SRCs to attempt to find various matches, as described, for example, hereinabove in more detail. In S640, it is checked if at least one match was found and, if so, execution continues with S650; otherwise, execution continues with S660. In S650, the SRC is associated with one or more of the concept structures to which the SRC has been shown to match. In S660, it is checked whether additional SRCs have been received, and if so execution continues with S610; otherwise, execution terminates.

A person skilled in the art should appreciate that the DCC system 100 creates automatically, and in an unsupervised fashion, concept structures of a wide variety of MMDEs. When checking a new MMDE, it may be checked against the concept structures stored, for example, in the database 150 and/or the concept database 180, and upon detection of a match provides the concept information about the MMDE. With the number of concept structures being significantly lower than the number of MMDEs, the solution is cost effective and scalable for the purpose of identification of content of a MMDE.

According to various embodiments disclosed herein, the concept structures are further utilized to index the MMDEs, in particular, to a set of indices that are created based on mapping to the concept structures database. The indices of the MMDEs are stored in the database 180, whereas the MMDEs can be deleted.

Figure 7:
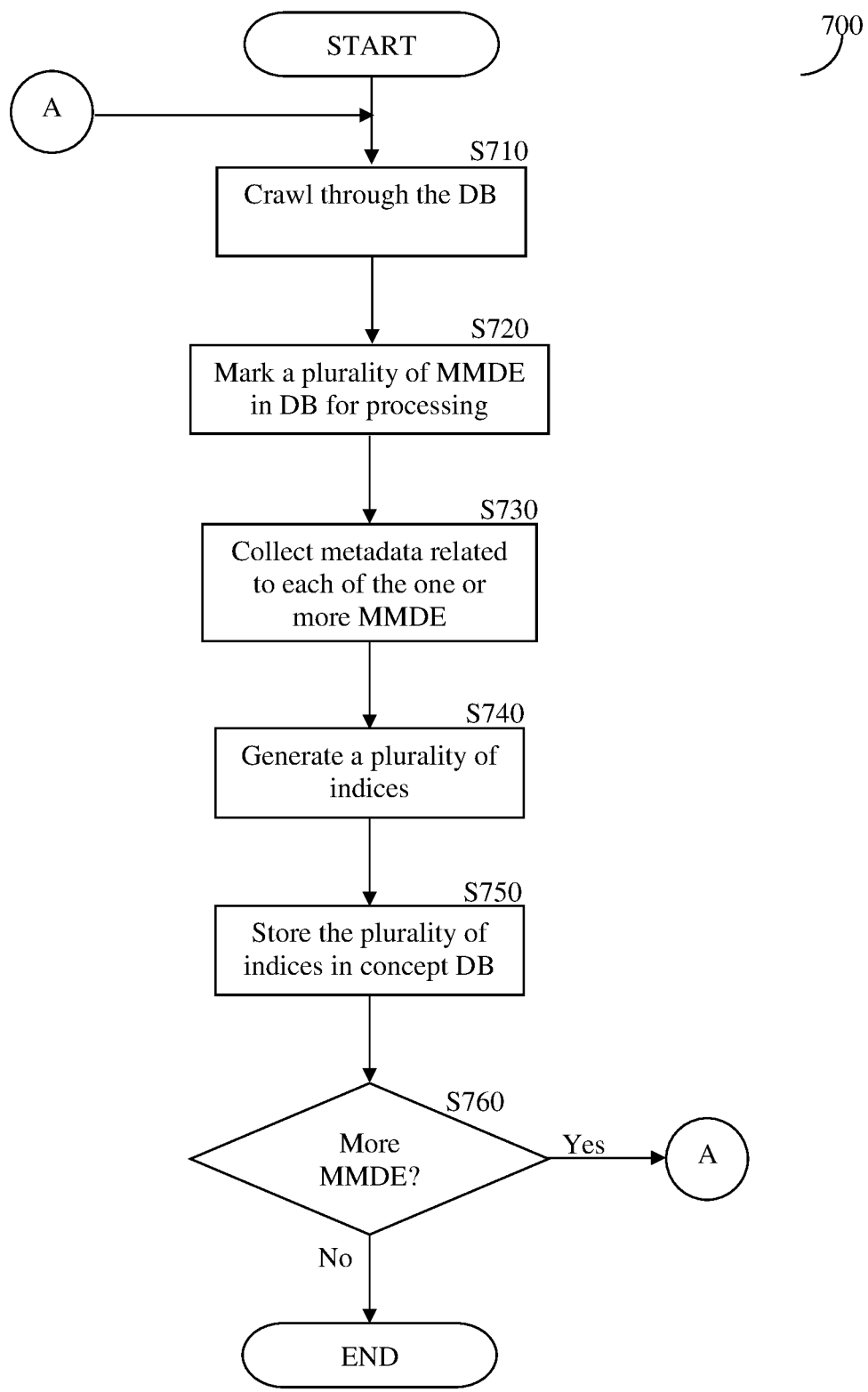
FIG. 7 is a flowchart illustrating a method for generating a concept database in accordance with one embodiment.

FIG. 7 shows an example flowchart 700 of the operation of the index generator 170 in accordance with one embodiment disclosed herein. In S710, the index generator 170 crawls through the database 150 to access and identify MMDEs stored therein or referenced therefrom. In S720, each of the identified MMDEs is marked as required for further processing. In S730, metadata respective of each of the identified MMDEs is collected. As noted above, the metadata may be in the form of the plurality of patches created by the patch attention processor 110 from each MMDE, one or more signatures generated by the signature generator 120 respective of each MMDE, and the concept structure matched for each MMDE respective of the signatures of the MMDE. The metadata may be collected from such resources respectively.

In S740, using the collected metadata, the index generator 170 generates a plurality of indices respective of each MMDE. In one embodiment, S740 includes matching the metadata of a MMDE against concept structures saved in the concept database 180. For each matching concept structure, an index is generated for the MMDE. The index is a mapping of a MMDE to a matching concept structure.

In S750, the plurality of indices is stored in the concept database 180 for future use. As noted above, in an embodiment, the concept database 180 maintains the concept structures. In another embodiment, the concept structures are saved in the database 150, which may also include the concept database 180. The concept structures are generated by the concept generator 140 as discussed above. It should be noted that if the metadata of the respective MMDE does not match any of concept structures, a request is sent for the concept generator 140 to create a new structure; alternatively an error message may be generated and displayed on the display of a user device.

In an embodiment, S750 may further include associating one or more of the indices with respective users. To this end, S750 may include comparing a signature representing the concept structure mapped to each index to signatures representing user identifiers. Each user identifier represents a user and may be a multimedia content element featuring the user. As non-limiting examples, the user identifiers may be images or videos showing the user, audio in which the user is heard speaking, and the like. Based on the comparison, a matching user is determined for one or more of the indices.

In S760, it is checked by the index generator 170 whether there are additional MMDEs in the database 150, and if so, execution continues with S710; otherwise, execution terminates.

Figure 8:
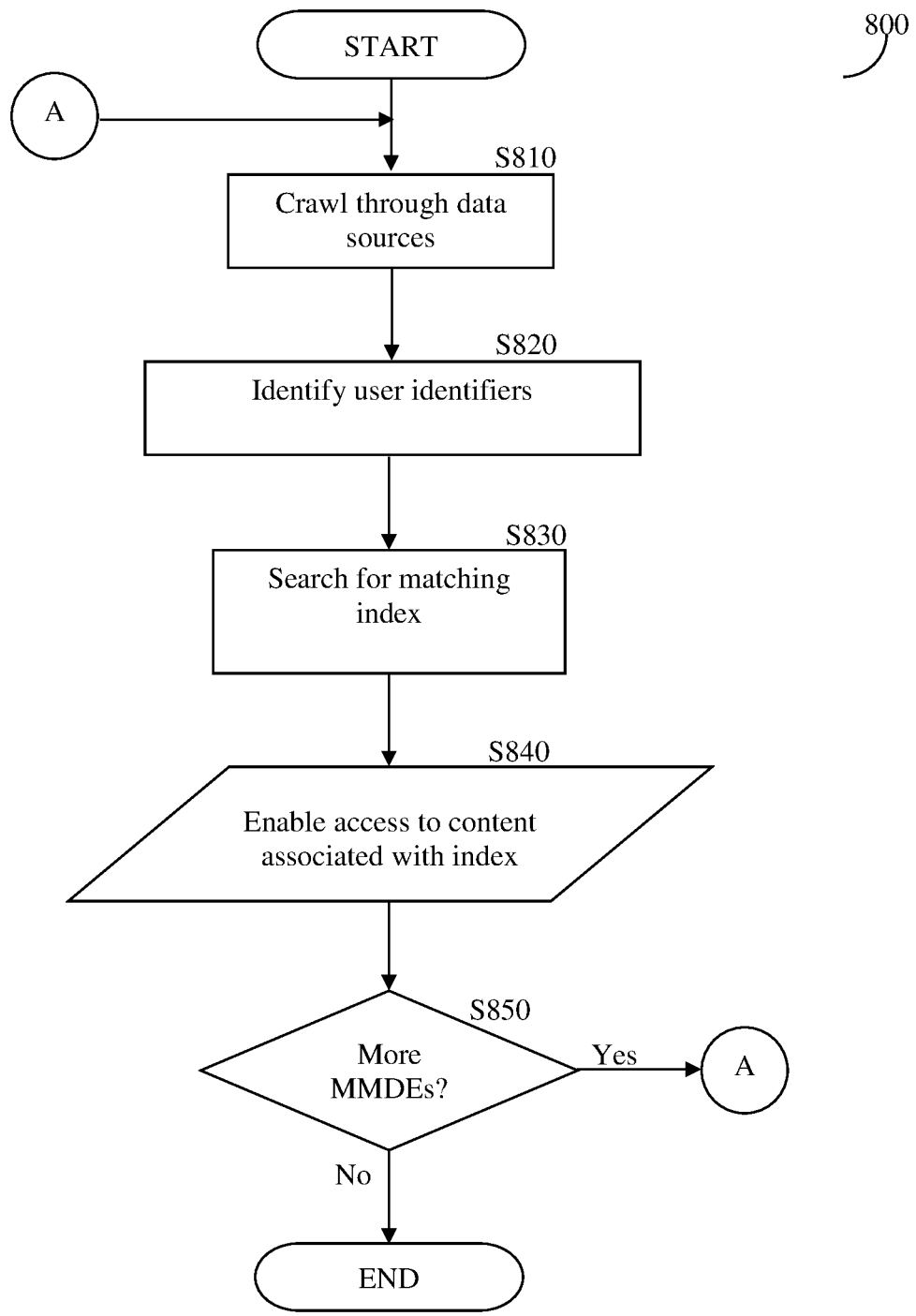
FIG. 8 is a flowchart illustrating a method for sharing multimedia content of a concepts database according to an embodiment.

FIG. 8 is an example flowchart 800 illustrating a method for providing access to a concept database by a user based on user identifiers according to an embodiment.

In S810, one or more data sources are crawled through. The data sources may include, but are not limited to, databases, servers, web platforms, and the like. As a non-limiting example, the data sources may include servers of social media platforms including MMDEs posted by users to social media accounts.

In S820, user identifiers found during the crawl are identified. The user identifiers are MMDEs representing users such as, but not limited to, images showing the users, audio in which the users' voices are heard, and the like. For example, the user identifiers may include images showing users' faces. The user identifiers may be identified based on metadata, based on signatures generated for MMDEs in the data sources (e.g., signatures generated as described herein), and the like. For example, images having metadata "selfies" may be determined to be user identifiers.

In S830, based on the identified user identifiers, a matching index is searched for in the concept database. The concept database is populated as described further herein above, and includes indices matching MMDEs to concept structures stored in the concept database. The searching may be based on, but is not limited to, comparing metadata of the user identifiers to metadata of the associated indices.

In S840, access to MMDEs associated with the matching index in the concept database is enabled. Enabling the access may include, but is not limited to, allowing a user represented by the user identifiers to view, download, or share the accessed MMDEs. Alternatively, enabling access may include sending the accessed MMDEs.

At S850, it is determined if more MMDEs are available and, if so, execution continues with S810; otherwise, execution terminates. Accordingly, access to newly added MMDEs (e.g., MMDEs that have been recently posted to a social media account) may be granted as the new MMDEs become available.

It should be noted that various embodiments described herein are discussed with respect to creating a concept database based on user identifiers merely for simplicity purposes and without limitation on the disclosed embodiments. The concept database may be indexed with respect to any entity identified based on analysis of multimedia content elements, and the access to the corresponding indexed multimedia content elements of the concept database may be granted to the entity or to another entity. The entity may be, but is not necessarily, a user of the system creating the concept database, a user of a service offering creation of the concept database, any other user (e.g., a user of a third party social media platform), an entity represented by a user (e.g., a pet owned by a user), and the like.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for populating a concept database based on a plurality of multimedia data elements (MMDEs) and at least one user identifier, the concept database including a plurality of concept structures, comprising:

clustering a plurality of signatures of the plurality of MMDEs into a cluster of signatures;

reducing the number of signatures in the cluster to create a signature reduced cluster (SRC);

generating, based on the SRC and the plurality of concept structures, an index, wherein the index maps the plurality of MMDEs to a matching concept structure of the plurality of concept structures;

associating the index with a user based on the at least one user identifier;

storing the index and the plurality of MMDEs in the concept database;

finding a first SRC and a second SRC that are associated to each other; wherein the finding comprises determining that the first SRC is associated with the second SRC based on (a) a partial match between metadata associated with first SRC and metadata associated with the second SRC, and (b) a partial match between one or more signatures of the first SRC and one or more signatures of the second SRC; and associating, with the second SRC, metadata related to the first SRC.

2. The method of claim 1, wherein each user identifier is a visual identifier showing one of at least one user, wherein associating the user with the index further comprises: comparing at least one signature of each of the at least one user identifier to a signature of the matching concept structure to determine a matching user identifier, wherein the associated user is the user shown in the matching user identifier.

3. The method of claim 2, further comprising: enabling access to the plurality of MMDEs in the concept database by at least one user device of the associated user.

4. The method of claim 2, further comprising: retrieving the at least one user identifier from at least one web platform; sending the plurality of MMDEs to the associated user via the at least one web platform.

5. The method of claim 2, wherein generating the index for each created SRC further comprises: generating metadata for each signature of the created SRC; comparing the generated metadata to metadata associated with the plurality of concept structures to determine the matching concept structure, wherein each concept structure includes a plurality of SRCs and associated metadata.

6. The method of claim 5, further comprising: removing duplicated metadata of the generated metadata.

7. The method of claim 5, further comprising: for each of at least one portion of the generated metadata, removing all instances of the portion from the generated metadata when a number of repetitions of the portion in the generated metadata is below a threshold.

8. The method of claim 1, wherein clustering the plurality of signatures further comprises: generating a plurality of items from a received MMDE of the plurality of MMDEs; determining the items that are of interest for signature generation; and sending, to a signature generator, the determined items of interest, wherein the signature generator is configured to generate the plurality of signatures based on the determined items of interest.

9. The method according to claim 1 comprising generating the plurality of signatures of the plurality of MMDEs; wherein each signature of the plurality of signatures is a response of one or more neural networks to at least a portion of one of the MMDEs.

10. The method according to claim 2, comprising generating the plurality of signatures of the plurality of MMDEs by independent computational cores.

11. A non-transitory computer readable medium having stored thereon instructions for causing one or more processing units to execute a process, the process comprising:
clustering a plurality of signatures of a plurality of MMDEs into a cluster of signatures;
reducing the number of signatures in the cluster to a create a signature reduced cluster (SRC);
generating, based on the SRC and a plurality of concept structures stored in a concept database, an index, wherein the index maps the plurality of MMDEs to a matching concept structure of the plurality of concept structures;
associating the index with a user based on the at least one user identifier; storing the index and the plurality of MMDEs in the concept databases;
finding a first SRC and a second SRC that are associated to each other; wherein the finding comprises determining that the first SRC is associated with the second SRC based on (a) a partial match between metadata associated with first SRC and metadata associated with the second SRC, and (b) a partial match between one or more signatures of the first SRC and one or more signatures of the second SRC; and
associating, with the second SRC, metadata related to the first SRC.

12. A system for populating a concept database based on a plurality of multimedia data elements (MMDEs) and at least one user identifier, the concept database including a plurality of concept structures, comprising: a processing circuitry; and a memory connected to the processing circuitry, the memory containing instructions that when executed by the processing circuitry, configure the system to: cluster a plurality of signatures of the plurality of MMDEs into a cluster of signatures; reduce the number of signatures in the cluster to create a signature reduced cluster (SRC); generate, based on the SRC and the plurality of concept structures, an index, wherein the index maps the plurality of MMDEs to a matching concept structure of the plurality of concept structures; associate the index with a user based on the at least one user identifier; store the index and the plurality of MMDEs in the concept database; find a first SRC and a second SRC that are associated to each other by determining that the first SRC is associated with the second SRC based on (a) a partial match between metadata associated with first SRC and metadata associated with the second SRC, and (b) a partial match between one or more signatures of the first SRC and one or more signatures of the second SRC; and associate, with the second SRC, metadata related to the first SRC.

13. The system of claim 12, wherein each user identifier is a visual identifier showing one of at least one user, wherein the system is further configured to: compare at least one signature of each of the at least one user identifier to a signature of the matching concept structure to determine a matching user identifier, wherein the associated user is the user shown in the matching user identifier.

14. The system of claim 13, wherein the system is further configured to: enable access to the plurality of MMDEs in the concept database by at least one user device of the associated user.

15. The system of claim 13, wherein the system is further configured to: retrieve the at least one user identifier from at least one web platform; send the plurality of MMDEs to the associated user via the at least one web platform.

16. The system of claim 13, wherein the system is further configured to: generate metadata for each signature of the created SRC; compare the generated metadata to metadata associated with the plurality of concept structures to determine the matching concept structure, wherein each concept structure includes a plurality of SRCs and associated metadata.

17. The system of claim 16, wherein the system is further configured to: remove duplicated metadata of the generated metadata.

18. The system of claim 16, wherein the system is further configured to: for each of at least one portion of the generated metadata, remove all instances of the portion from the generated metadata when a number of repetitions of the portion in the generated metadata is below a threshold.

19. The system of claim 12, wherein the system is further configured to: generate a plurality of items from a received MMDE of the plurality of MMDEs; determine the items that are of interest for signature generation; and send, to a signature generator, the determined items of interest, wherein the signature generator is configured to generate the plurality of signatures based on the determined items of interest.

20. A method for populating a concept database based on a plurality of multimedia data elements (MMDEs) and at least one user identifier, the concept database including a plurality of concept structures, comprising:

generating a plurality of signatures of the plurality of MMDEs;

wherein each signature of the plurality of signatures is a response of one or more neural networks to at least a portion of one of the MMDEs clustering a plurality of signatures of the plurality of MMDEs into a cluster of signatures;

reducing the number of signatures in the cluster to create a signature reduced cluster (SRC);

generating, based on the SRC and the plurality of concept structures, an index, wherein the index maps the plurality of MMDEs to a matching concept structure of the plurality of concept structures; and associating the index with a user based on the at least one user identifier; storing the index and the plurality of MMDEs in the concept database;

wherein each user identifier is a visual identifier showing one of at least one user, wherein associating the user with the index further comprises: comparing at least one signature of each of the at least one user identifier to a signature of the matching concept structure to determine a matching user identifier, wherein the associated user is the user shown in the matching user identifier;

generating the plurality of signatures of the plurality of MMDEs by independent computational cores;

wherein each of said independent computational cores comprising properties having at least some statistical independency from other of said computational cores, said properties being set independently of each other of said computational cores.

21. The method according to claim 20 comprising finding a first SRC and a second SRC that are associated to each other; and associating, with the second SRC, metadata related to the first SRC.

22. The method according to claim 21 comprising determining that the first SRC is associated with the second SRC based on (a) a partial match between metadata associated with first SRC and metadata associated with the second SRC, and (b) a partial match between one or more signatures of the first SRC and one or more signatures of the second SRC.

23. The method according to claim 21 comprising associating the second SRC with a concept structure associated with the first SRC.

* * * * *